United States Patent
Hashimoto

(10) Patent No.: US 10,996,436 B2
(45) Date of Patent: *May 4, 2021

(54) IMAGING LENS

(71) Applicant: KANTATSU CO., LTD., Yaiti (JP)

(72) Inventor: Masaya Hashimoto, Sukagawa (JP)

(73) Assignee: KANTATSU CO., LTD., Tochigi (JP)

(*) Notice: Subject to any disclaimer, the term of this patent is extended or adjusted under 35 U.S.C. 154(b) by 137 days.

This patent is subject to a terminal disclaimer.

(21) Appl. No.: 15/906,611

(22) Filed: Feb. 27, 2018

(65) Prior Publication Data

US 2018/0188498 A1    Jul. 5, 2018

Related U.S. Application Data

(63) Continuation of application No. 15/357,329, filed on Nov. 21, 2016, now Pat. No. 10,705,318, which is a (Continued)

(30) Foreign Application Priority Data

Sep. 11, 2013  (JP) .................................. 2013-188413

(51) Int. Cl.
G02B 13/00    (2006.01)
G02B 9/64     (2006.01)
G02B 27/00    (2006.01)

(52) U.S. Cl.
CPC ........... *G02B 13/0045* (2013.01); *G02B 9/64* (2013.01); *G02B 27/0025* (2013.01)

(58) Field of Classification Search
CPC .... G02B 21/02; G02B 21/33; G02B 27/0068; G02B 27/646; G02B 27/0025;

(Continued)

(56) References Cited

U.S. PATENT DOCUMENTS 5,331,465 A * 7/1994 Miyano ................. G02B 13/00
                                                      359/693
5,642,229 A   6/1997 Kaneko et al.
(Continued)

FOREIGN PATENT DOCUMENTS

CN    102621667 A    8/2012
CN    202886713 U    4/2013
(Continued)

OTHER PUBLICATIONS

Mar. 10, 2016 Office Action issued in U.S. Appl. No. 14/226,856.
(Continued)

*Primary Examiner* — Joseph P Martinez
*Assistant Examiner* — Vipin Patel
(74) *Attorney, Agent, or Firm* — Hamre, Schumann, Mueller & Larson, P.C.

(57) ABSTRACT

An imaging lens which uses a larger number of constituent lenses for higher performance and features compactness and a wide field of view. The imaging lens is composed of seven lenses to form an image of an object on a solid-state image sensor. The constituent lenses are arranged in the following order from an object side to an image side: a first lens with positive refractive power; a second lens with positive or negative refractive power; a third lens with negative refractive power; a fourth lens with positive or negative refractive power as a double-sided aspheric lens; a meniscus fifth lens having a convex surface on the image side; a sixth lens with positive or negative refractive power as a double-sided aspheric lens; and a seventh lens with negative refractive power, in which an air gap is provided between lenses.

20 Claims, 30 Drawing Sheets

Related U.S. Application Data continuation of application No. 14/226,856, filed on Mar. 27, 2014, now Pat. No. 9,507,125.

(58) Field of Classification Search
CPC ...... G02B 13/22; G02B 13/24; G02B 13/009; G02B 13/04; G02B 13/18; G02B 13/00; G02B 13/06; G02B 15/177; G02B 9/62; G02B 9/64; G02B 1/00

See application file for complete search history.

(56) References Cited

U.S. PATENT DOCUMENTS

| | | | |
|---|---|---|---|
| 6,181,484 B1* | 1/2001 | Sato | G02B 15/142 |
| | | | 359/692 |
| 8,599,495 B1 | 12/2013 | Tsai et al. | |
| 9,116,239 B1 | 8/2015 | Billsberry | |
| 2009/0296234 A1 | 12/2009 | Asami | |
| 2013/0050846 A1 | 2/2013 | Huang | |
| 2014/0009843 A1* | 1/2014 | Tsai | G02B 9/64 |
| | | | 359/708 |
| 2014/0043694 A1 | 2/2014 | Tsai et al. | |
| 2014/0139719 A1 | 5/2014 | Fukaya | |
| 2014/0160580 A1* | 6/2014 | Nishihata | G02B 13/0045 |
| | | | 359/708 |
| 2014/0211324 A1 | 7/2014 | Ishizaka | |
| 2014/0293100 A1 | 10/2014 | Sasaya | |
| 2014/0376105 A1 | 12/2014 | Sekine | |
| 2015/0009578 A1 | 1/2015 | Shinohara et al. | |

FOREIGN PATENT DOCUMENTS

| | | |
|---|---|---|
| CN | 203595858 U | 5/2014 |
| CN | 203941337 U | 11/2014 |
| CN | 204028445 U | 12/2014 |
| JP | 2010-262270 A | 11/2010 |
| JP | 2012-155223 A | 8/2012 |
| TW | 201606345 A | 2/2016 |

OTHER PUBLICATIONS

Jul. 23, 2015 Office Action issued in U.S. Appl. No. 14/226,856.
Jul. 19, 2016 Notice of Allowance issued in U.S. Appl. No. 14/226,856.
Sep. 11, 2018 Office Action Issued in U.S. Appl. No. 15/357,329.

\* cited by examiner

IMAGING LENS

The present application is a continuation of U.S. patent application Ser. No. 15/357,329 filed Nov. 21, 2016, which is a continuation of U.S. patent application Ser. No. 14/226,856 filed Mar. 27, 2014, the entire contents of which are hereby incorporated by reference. The present application is based on and claims priority of Japanese patent application No. 2013-188413 filed on Sep. 11, 2013, the entire contents of which are hereby incorporated by reference.

The present application is based on and claims priority of Japanese patent application No. 2013-188413 filed on Sep. 11, 2013, the entire contents of which are hereby incorporated by reference.

BACKGROUND OF THE INVENTION

Field of the Invention

The present invention relates to imaging lenses which form an image of an object on a solid-state image sensor such as a CCD sensor or a C-MOS sensor used in a compact image pickup device. More particularly, the invention relates to imaging lenses which are built in image pickup devices mounted in highly functional products such as smart TVs and 4K TVs, information terminals such as game consoles and PCs, and mobile terminals such as smart phones, mobile phones and PDAs (Personal Digital Assistants).

Description of the Related Art

In recent years, highly functional products, such as a smart TV as a TV with a personal computer function and a 4K TV as a TV with four times higher resolution than a full high-definition TV, have been attracting attention. As for smart TVs, there has been a tendency towards more multi-functional models such as ones which incorporate an image pickup device capable of taking a high resolution image and can transmit the image through a communication network, in addition to the high functionality. Also, due to its high resolution, a 4K TV can reproduce an image which is so realistic as if the object were there. These products are expected to provide a wider range of functions than before: for example, a security function combined with a high-accuracy face recognition function and a moving body detection function, a pet monitoring function, and a function of editing an image captured by image processing technology in various ways. If these products have an ability to take higher resolution images or moving images, they are expected to become products which increase the satisfaction of the general consumers. On the other hand, recently introduced into the market are smart phones which use an image sensor with a resolution of more than 40 megapixels to provide a professional quality digital camera function. Therefore, there is a growing demand for higher camera performance for these products.

However, in the conventional techniques, it is difficult to provide an imaging lens which satisfies the performance requirement of the devices as mentioned above. For example, the image pickup device used in a smart TV or smart phone with a high resolution imaging function is assumed to adopt a relatively large image sensor suitable for high resolution images. In that case, since a larger image sensor is used, there arises the following problem: the optical system should be larger, so it is difficult to correct various aberrations and it is impossible to maintain the high optical performance achieved so far with a conventional smaller image sensor. In addition, in the case of a monitoring camera, the following problem may arise: the camera is required to use a wide-field of view imaging lens and when the lens is designed to provide a wide field of view, correction of aberrations may be very difficult particularly in the peripheral area regardless of image sensor size and it may be impossible to deliver satisfactory optical performance.

Furthermore, when an imaging lens is used in an image pickup device with an autofocus function which is recently popular, high optical performance must be ensured in both imaging of an object at infinity and imaging of an object at close range, but this is very difficult particularly when the image sensor in use is large. In addition, for mobile terminals including smart phones, the imaging lenses must be always compact enough to meet the product design need.

As an imaging lens built in an apparatus with an image pickup device, the imaging lens described in JP-A-2010-262270 (Patent Document 1) or the imaging lens described in JP-A-2012-155223 (Patent Document 2) is known.

Patent Document 1 discloses an imaging lens which includes, in order from an object side, a first lens with positive refractive power having a convex shape on the object-side surface near an optical axis, a second lens with negative refractive power, a third lens with positive refractive power having a concave shape on an image-side surface near the optical axis, a fourth lens with positive refractive power having a convex shape on the image-side surface near the optical axis, and a fifth lens with negative refractive power near the optical axis. The imaging lens described in Patent Document 1 includes five constituent lenses (elements), each of which is optimized to deliver high performance.

Patent Document 2 discloses an imaging lens which includes, in order from an object side, a first lens group with positive refractive power, a second lens group with negative refractive power, a third lens group with positive refractive power, a fourth lens group with negative refractive power, a fifth lens group with positive refractive power, and a sixth lens group with negative refractive power. In the imaging lens described in Patent Document 2, the lens configuration of the optical system is concentric with an aperture stop so as to suppress astigmatism and coma aberrations and achieve a wider field of view.

In the imaging lens described in Patent Document 1, five constituent lenses are used for higher performance and the lens system provides a relatively wide field of view with a half field of view of about 38 degrees. However, its ability to correct aberrations with the five constituent lenses is limited and insufficient to respond the recent demand for higher resolution.

According to the use of six lens groups, the imaging lens described in Patent Document 2 provides a relatively wide field of view and can correct aberrations properly. However, in imaging of an object at infinity and imaging of an object at close range, a specific lens group must be moved in the optical axis direction for focusing, so there is a problem that the structure is complicated. Also, if the lens configuration described in Patent Document 2 is employed to provide a wide field of view, correction of aberrations will be difficult particularly in the peripheral area and high optical performance cannot be delivered.

As stated above, in the conventional techniques, it is difficult to provide a compact imaging lens which can take a high resolution image as demanded in recent years with a wide field of view and delivers high performance in both imaging of an object at infinity and imaging of an object at close range.

SUMMARY OF THE INVENTION

The present invention has been made in view of the above problem and an object thereof is to provide a compact imaging lens which delivers higher optical performance than existing imaging lenses, when it is used not only in a conventional small image sensor but also in a large image sensor, and can correct various aberrations properly in both imaging of an object at infinity and imaging of an object at close range even though it provides a wide field of view.

A "compact" imaging lens here means an imaging lens in which the ratio of total track length TTL to the length (2ih) of the diagonal of the effective image plane of the image sensor, that is, TTL/2ih is 1.0 or less. "Total track length" means the distance from the object-side surface of an optical element nearest to an object to the image plane on the optical axis in an optical system.

According to one aspect of the present invention, there is provided an imaging lens in which constituent lenses are arranged in the following order from an object side to an image side: a first lens with positive refractive power, a second lens with positive or negative refractive power, a third lens with negative refractive power, a fourth lens with positive or negative refractive power as a double-sided aspheric lens, a meniscus fifth lens having a convex surface on the image side, a sixth lens with positive or negative refractive power as a double-sided aspheric lens, and a seventh lens with negative refractive power. In the imaging lens, an air gap is provided between constituent lenses.

In the above imaging lens, the first lens and the second lens have adequate refractive power so that spherical aberrations are suppressed and the total track length is short. The third lens with negative refractive power corrects spherical aberrations and chromatic aberrations properly. The fourth lens, a double-sided aspheric lens corrects axial chromatic aberrations and high-order spherical aberrations and suppresses coma aberrations. The meniscus fifth lens, which has a convex surface on the image side, guides off-axial light rays to the sixth lens while keeping the refraction angles of the rays small and mainly corrects astigmatism and field curvature properly. The sixth lens, a double-sided aspheric lens with positive or negative refractive power, corrects field curvature and distortion properly in the peripheral area of the image and also controls the angle of a chief ray incident on the image sensor properly. The seventh lens, located nearest to the image plane, has negative refractive power, making the imaging lens nearly a telephoto lens.

Regarding all the constituent lenses of the imaging lens according to the present invention, an air gap is provided between lenses. Each lens surface can be made aspheric as needed in order to correct aberrations properly. If a cemented lens is used, the spherical cemented surface is usually made of glass material but a glass cemented lens is hard to manufacture and not suitable for mass production. In the present invention, all the lenses are made of plastic material and many of the lens surfaces are aspheric as needed to realize a high-performance low-cost optical system suitable for mass production.

Preferably, in the imaging lens according to the present invention, the first lens is a lens with positive refractive power having a convex surface on the object side, the second lens is a lens with positive or negative refractive power having a convex surface on the image side, and at least one of the facing surfaces of the first lens and the second lens is a concave surface. This combination of lens surfaces suppresses spherical aberrations and is also useful in correcting field curvature. More preferably, the relation of $r1<|r2|$ holds, where r1 denotes the curvature radius of the object-side surface of the first lens and r2 denotes the curvature radius of the image-side surface of the first lens.

Preferably, the imaging lens according to the present invention satisfies a conditional expression (1) below:

$$0 < f12 \tag{1}$$

where f12: composite focal length of the first lens and the second lens

The conditional expression (1) means that the composite focal length of the first lens and the second lens is a positive value. When the composite refractive power of these two lenses has a positive value, the total track length is shortened.

In the imaging lens according to the present invention, the third lens is a lens with negative refractive power which has a concave surface on the image side near an optical axis and corrects spherical aberrations and axial chromatic aberrations properly. Preferably, in order to make it easy to correct off-axial aberrations, both the surfaces of the third lens are aspheric. If the third lens has a meniscus shape having a convex surface on the object side near the optical axis, spherical aberrations and axial chromatic aberrations can be corrected more properly. Furthermore, if the aspheric image-side surface of the third lens is designed so that its negative refractive power is weaker as the distance from the optical axis is larger, it prevents light rays from jumping in the peripheral portion and can correct various off-axial aberrations properly.

Preferably, in the imaging lens according to the present invention, the fourth lens is a biconvex lens having a convex surface on the object side near the optical axis or a meniscus lens having a convex surface on the object side near the optical axis.

The fourth lens plays an important role in suppressing high-order spherical aberrations or coma aberrations which occur on the first lens and the second lens. The convex object-side surface of the fourth lens should be an aspheric surface which has a relatively large curvature radius to reduce change in the amount of sag so that the aberrations as mentioned above are corrected properly. More specifically, it is desirable that the curvature radius of the fourth lens should be 70% of the focal length of the overall optical system or more.

Preferably, in the imaging lens according to the present invention, the image-side surface of the sixth lens has an aspheric shape in which the portion near the optical axis has a concave shape on the image side and the concave shape changes to a convex shape in the peripheral portion distant from the optical axis.

When the image-side surface of the sixth lens has an aspheric shape in which the portion near the optical axis has a concave shape and the concave shape changes to a convex shape in the peripheral portion, field curvature and distortion can be corrected properly. In addition, due to this aspheric surface, the angle of a chief ray incident on the image sensor can be controlled properly. If the sixth lens is a meniscus lens having a convex surface on the object side near the optical axis, preferably the object-side surface of the sixth lens has an aspheric shape in which the peripheral portion of the object-side surface is concave. When this shape is adopted, it is easy to control the angle of a chief ray and ensure that the performance in imaging of an object at infinity is equivalent to the performance in imaging of an object at close range.

Preferably, the imaging lens according to the present invention satisfies a conditional expression (2) below:

$$0.6 < f12/f < 1.3 \quad (2)$$

where
f12: composite focal length of the first lens and the second lens
f: focal length of the overall optical system of the imaging lens The conditional expression (2) defines an adequate range for the ratio of the composite focal length of the first lens and the second lens to the focal length of the overall optical system of the imaging lens.

If the value is above the upper limit of the conditional expression (2), the positive composite refractive power of the first lens and the second lens would be too weak, making it difficult to shorten the total track length. On the other hand, if the value is below the lower limit of the conditional expression (2), the positive composite refractive power of the first lens and the second lens would be too strong, undesirably resulting in an increase in the amount of spherical aberration.

Preferably, the imaging lens according to the present invention satisfies a conditional expression (3) below:

$$-2.2 < f3/f < -1.0 \quad (3)$$

where
f3: focal length of the third lens
f: focal length of the overall optical system of the imaging lens The conditional expression (3) defines an adequate range for the ratio of the focal length of the third lens to the focal length of the overall optical system of the imaging lens and indicates a condition to correct chromatic aberrations properly.

If the value is above the upper limit of the conditional expression (3), the negative refractive power of the third lens would be too strong, making it difficult to shorten the total track length. On the other hand, if the value is below the lower limit of the conditional expression (3), the negative refractive power of the third lens would be too weak, making it difficult to correct chromatic aberrations properly. If the value falls within the range defined by the conditional expression (3), a compact optical system which can correct chromatic aberrations properly can be obtained.

Preferably, the imaging lens according to the present invention satisfies a conditional expression (4) below:

$$0.6 < f45/f < 2.2 \quad (4)$$

where
f45: composite focal length of the fourth lens and the fifth lens
f: focal length of the overall optical system of the imaging lens The conditional expression (4) defines an adequate range for the ratio of the composite focal length of the fourth lens and the fifth lens to the focal length of the overall optical system of the imaging lens and indicates a condition to correct various aberrations properly.

If the value is above the upper limit of the conditional expression (4), the composite refractive power of the fourth lens and the fifth lens would weaken, making it difficult to correct axial chromatic aberrations. On the other hand, if the value is below the lower limit of the conditional expression (4), the composite refractive power of the fourth lens and the fifth lens would be too strong, making it difficult to correct coma aberrations and field curvature.

A more preferable form of the conditional expression (4) is a conditional expression (4a) below:

$$0.7 < f45/f < 2.0 \quad (4a)$$

where
f45: composite focal length of the fourth lens and the fifth lens
f: focal length of the overall optical system of the imaging lens Preferably, the imaging lens according to the present invention satisfies a conditional expression (5) below:

$$-2.0 < f67/f < -0.6 \quad (5)$$

where
f67: composite focal length of the sixth lens and the seventh lens
f: focal length of the overall optical system of the imaging lens The conditional expression (5) defines an adequate range for the ratio of the composite focal length of the sixth lens and the seventh lens to the focal length of the overall optical system of the imaging lens and indicates a condition to correct various aberrations properly.

If the value is above the upper limit of the conditional expression (5), the composite refractive power of the sixth lens and the seventh lens would be too strong, making it difficult to correct distortion and field curvature. On the other hand, if the value is below the lower limit, the composite refractive power of the sixth lens and the seventh lens would weaken, making it difficult to correct axial chromatic aberrations.

Preferably, the imaging lens according to the present invention satisfies conditional expressions (6) to (8) below:

$$50 < vd1 < 70 \quad (6)$$

$$50 < vd2 < 70 \quad (7)$$

$$20 < vd3 < 30 \quad (8)$$

where
vd1: Abbe number of the first lens at d-ray
vd2: Abbe number of the second lens at d-ray
vd3: Abbe number of the third lens at d-ray The conditional expressions (6) to (8) define adequate ranges for the Abbe numbers of the first to third lenses respectively. When a low-dispersion material is used for the first lens and the second lens and a high-dispersion material is used for the third lens, chromatic aberrations can be corrected properly.

In the imaging lens according to the present invention, the seventh lens is a double-sided aspheric lens with negative refractive power. Since the seventh lens, located nearest to the image plane, has negative refractive power, the imaging lens nearly functions as a telephoto lens so that the total track length is short and it is easy to ensure an adequate back focus. The seventh lens has only to provide negative refractive power near the optical axis. In other words, the seventh lens may be any of the following three types: a lens having a biconcave shape near the optical axis, a meniscus lens having a concave surface on the image side near the optical axis, and a meniscus lens having a convex surface on the image side near the optical axis. In particular, if a biconcave lens having a concave surface on the image side near the optical axis or a meniscus lens having a concave surface on the image side near the optical axis is adopted, it is preferable that the concave shape of the aspheric image-side surface near the optical axis should change to a convex shape in its peripheral portion. Such surface shape is more effective in correcting mainly distortion and field curvature and in controlling the angle of rays incident on the image sensor.

DETAILED DESCRIPTION OF THE PREFERRED EMBODIMENTS

Hereinafter, the preferred embodiment of the present invention will be described in detail referring to the accompanying drawings.

FIGS. 1, 4, 7, 10, 13, 16, 19, 22, 25, and 28 are schematic views showing the general configurations of the imaging lenses according to Examples 1 to 10 of the present embodiment, respectively. Since all these Examples have the same basic configuration, a general explanation of an imaging lens according to the present embodiment is mainly given below referring to the schematic view of Example 1.

Figure 1:
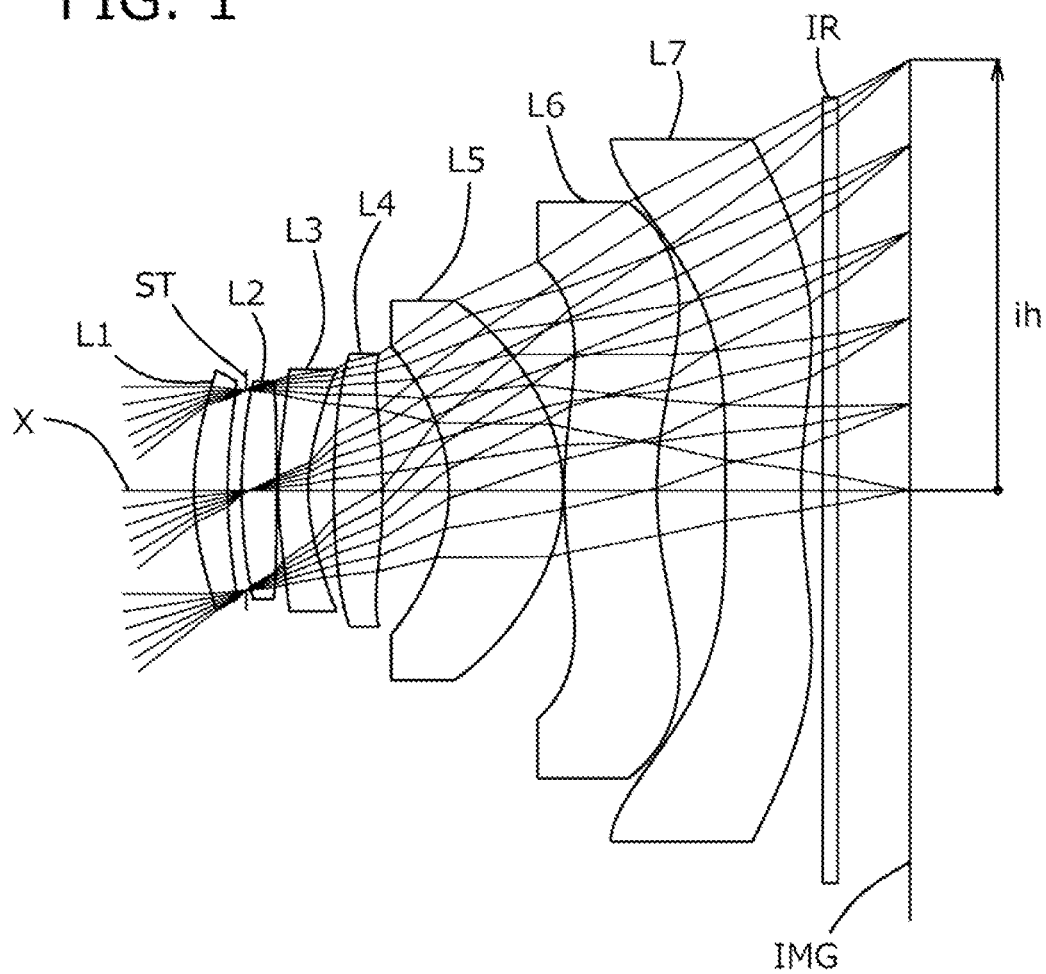
FIG. 1 is a schematic view showing the general configuration of an imaging lens according to Example 1.

As shown in FIG. 1, in the imaging lens according to the present embodiment, the elements are arranged in the following order from an object side to an image side: a first lens L1 with positive refractive power, a second lens L2 with positive refractive power, a third lens L3 with negative refractive power, a fourth lens L4 with positive refractive power as a double-sided aspheric lens, a fifth lens L5 as a meniscus lens having a convex surface on the image side, a sixth lens L6 with negative refractive power as a double-sided aspheric lens, and a seventh lens L7 with negative refractive power, in which an air gap is provided between constituent lenses. An aperture stop ST is located between the first lens L1 and the second lens L2, and a filter IR is located between the seventh lens L7 and an image plane IMG. This filter IR is omissible.

The first lens L1 is a meniscus lens having a convex surface on the object side. The second lens L2 is a biconvex lens having a convex surface on the image side. The composite refractive power of these two lenses is designed to have an adequate positive value so that the total track length is short. At least one of the facing surfaces of the first lens L1 and the second lens L2 is concave so that spherical aberrations are suppressed. Therefore, the shape of the first lens L1 is not limited to a meniscus shape having a convex surface on the object side and for example, it may be a biconvex lens as seen in Examples 5, 7 and 10 which will be described later. In that case, however, the object-side surface of the second lens L2 must be concave.

The third lens L3 is a meniscus lens having a concave surface on the image side near an optical axis X, in which aspheric surfaces are formed on both sides to correct spherical aberrations and axial chromatic aberrations which are generated on the first lens L1 and the second lens L2. The aspheric surface formed on the image side of the third lens L3 is so shaped that the negative refractive power weakens as the distance from the optical axis X increases. This prevents off-axial light rays emitted from the third lens L3 from jumping excessively. Consequently, it is also effective in correcting off-axial aberrations properly.

The fourth lens L4 is a double-sided aspheric lens with positive refractive power which has a biconvex shape near the optical axis X. The curvature radii of the object-side surface and the image-side surface of the fourth lens L4 are both not less than 70% of the focal length of the overall optical system of the imaging lens. The aspheric shape is designed to reduce change in the amount of sag. Such shape is effective in correcting axial chromatic aberrations and high-order spherical aberrations and suppressing coma aberrations. The fourth lens L4 is not limited to a lens having a biconvex shape near the optical axis X and for example, it may be a meniscus lens with negative refractive power having a convex surface on the object side near the optical axis X as seen in Example 7 or a meniscus lens with positive refractive power having a convex surface on the object side near the optical axis X as seen in Example 8.

The fifth lens L5 is a meniscus lens with weak positive refractive power having a convex surface on the image side and guides off-axial light rays to the sixth lens L6 at a small refraction angle and mainly corrects astigmatism and field curvature properly. The fifth lens L5 is not limited to a lens with positive refractive power. For example, the fifth lens L5 in Example 9 is a meniscus lens with negative refractive power having a concave surface on the image side.

The sixth lens L6 is a meniscus lens having a concave surface on the image side near the optical axis x in which the peripheral portion of the aspheric image-side surface is convex. Such aspheric shape is effective in properly correcting field curvature and distortion in the peripheral area of the image and controlling the angle of a chief ray incident on the image sensor adequately. Also, it is desirable that the sixth lens L6 should have weak negative refractive power near the optical axis X to reduce the influence of the refractive power on the overall optical system of the imaging lens and be mainly used for correction of aberrations, but it may have weak positive refractive power. For example, the sixth lens L6 in Example 9 has weak positive refractive power.

The seventh lens L7 is a double-sided aspheric lens with negative refractive power near the optical axis X. Since the seventh lens L7, located nearest to the image plane, has negative refractive power, an adequate back focus is ensured.

The seventh lens L7 has only to provide negative refractive power near the optical axis X; for example, in Examples 1, 2, 5, 7, 8 and 9, the seventh lens L7 has a biconcave shape near the optical axis X, in Examples 3 and 4, it is a meniscus lens having a concave image-side surface near the optical axis X, and in Examples 6 and 10, it is a meniscus lens having a convex image-side surface near the optical axis X. Particularly when the image-side surface is concave near the optical axis X, if the seventh lens L7 is designed so that the concave shape on the aspheric image-side surface changes to a convex shape in its peripheral portion, it is more effective in mainly correcting distortion and field curvature and controlling the angle of rays incident on the image sensor.

The imaging lens according to the present invention satisfies conditional expressions (1) to (8) below:

$$0 < f12 \quad (1)$$

$$0.6 < f12/f < 1.3 \quad (2)$$

$$-2.2 < f3/f < -1.0 \quad (3)$$

$$0.6 < f45/f < 2.2 \quad (4)$$

$$-2.0 < f67/f < -0.6 \quad (5)$$

$$50 < vd1 < 70 \quad (6)$$

$$50 < vd2 < 70 \quad (7)$$

$$20 < vd3 < 30 \quad (8)$$

where
f: focal length of the overall optical system of the imaging lens
f3: focal length of the third lens L3
f12: composite focal length of the first lens L1 and the second lens L2
f45: composite focal length of the fourth lens L4 and the fifth lens L5
f67: composite focal length of the sixth lens L6 and the seventh lens L7
vd1: Abbe number of the first lens L1 at d-ray
vd2: Abbe number of the second lens L2 at d-ray
vd3: Abbe number of the third lens L3 at d-ray Since the conditional expression (1) is satisfied, the composite refractive power of the first lens L1 and the second lens L2 has a positive value, leading to a shorter total track length.

Since the conditional expression (2) is satisfied, the ratio of the composite focal length of the first lens L1 and the second lens L2 to the focal length of the overall optical system of the imaging lens falls within the adequate range so that the total track length is shortened and spherical aberrations are corrected properly.

Since the conditional expression (3) is satisfied, the ratio of the negative focal length of the third lens L3 to the focal length of the overall optical system of the imaging lens falls within the adequate range so that the total track length is shortened and chromatic aberrations are corrected properly.

Since the conditional expression (4) is satisfied, the ratio of the positive composite focal length of the fourth lens L4 and the fifth lens L5 to the focal length of the overall optical system of the imaging lens falls within the adequate range so that axial chromatic aberrations, coma aberrations, and field curvature are corrected properly.

Since the conditional expression (5) is satisfied, the ratio of the negative composite focal length of the sixth lens L6 and the seventh lens L7 to the focal length of the overall optical system of the imaging lens falls within the adequate range so that distortion, field curvature, and axial chromatic aberrations are corrected properly.

Since the conditional expressions (6) to (8) are satisfied, chromatic aberrations are corrected properly.

In this embodiment, all the lens surfaces are aspheric. The aspheric shapes of these lens surfaces are expressed by the following Equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + \quad \text{Equation 1}$$

-continued
$$A_8H^8 + A_{10}H^{10} + A_{12}H^{12} + A_{14}H^{14} + A_{16}H^{16}$$

Next, the imaging lenses according to Examples of the present embodiment will be explained. In each Example, f denotes the focal length of the overall optical system of the imaging lens, Fno denotes an F-number, ω denotes a half field of view, ih denotes a maximum image height, and TTL denotes a total track length. i denotes a surface number counted from the object side, r denotes a curvature radius, d denotes the distance between lens surfaces on the optical axis (surface distance), Nd denotes a refractive index with respect to d-ray (reference wavelength), and vd denotes an Abbe number with respect to d-ray. As for aspheric surfaces, an asterisk (*) after surface number i indicates that the surface concerned is an aspheric surface. Total track length TTL indicated here is a distance (total track length) in which the filter IR located between the seventh lens L7 and the image plane IMG is removed.

Example 1

The basic lens data of Example 1 is shown below in Table 1.

TABLE 1

Example 1
in mm
f = 7.51
Fno = 2.6
ω(°) = 38.2
ih = 5.99
TTL = 9.88

Surface Data

| Surface No. i (Object Surface) | Curvature Radius r Infinity | Surface Distance d Infinity | Refractive Index Nd | Abbe Number vd |
|---|---|---|---|---|
| 1* | 3.924 | 0.468 | 1.5438 | 55.57 |
| 2* | 7.251 | 0.256 | | |
| 3 (Stop) | Infinity | −0.060 | | |
| 4* | 8.010 | 0.485 | 1.5438 | 55.57 |
| 5* | −48.281 | 0.018 | | |
| 6* | 4.641 | 0.422 | 1.6349 | 23.97 |
| 7* | 2.652 | 0.353 | | |
| 8* | 11.635 | 0.680 | 1.5438 | 55.57 |
| 9* | −7.596 | 0.921 | | |
| 10* | −2.398 | 1.584 | 1.5438 | 55.57 |
| 11* | −2.515 | 0.019 | | |
| 12* | 6.401 | 1.287 | 1.5438 | 55.57 |
| 13* | 5.113 | 0.955 | | |
| 14* | −85.8141 | 1.051 | 1.6142 | 25.58 |
| 15* | 6.9862 | 0.300 | | |
| 16 | Infinity | 0.210 | 1.5168 | 64.20 |
| 17 | Infinity | 0.985 | | |
| Image Plane | Infinity | | | |

Constituent Lens Data

| Lens | Start Surface | Focal Length |
|---|---|---|
| 1 | 1 | 14.98 |
| 2 | 4 | 12.67 |
| 3 | 6 | −10.62 |
| 4 | 8 | 8.56 |
| 5 | 10 | 25.17 |
| 6 | 12 | −72.11 |
| 7 | 14 | −10.47 |

| Lens | Composite Focal Length |
|---|---|
| First Lens-Second Lens | 7.09 |
| Fourth Lens-Fifth Lens | 7.96 |
| Sixth Lens-Seventh Lens | −9.56 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −2.298E+01 | −6.498E+00 | 0.000E+00 |
| A4 | −3.681E−03 | −5.084E−03 | 3.301E−03 | 3.772E−03 | −6.425E−03 | −2.244E−03 | 1.934E−03 |
| A6 | −1.125E−03 | −3.401E−04 | −3.268E−04 | −2.025E−03 | −9.035E−04 | 7.244E−04 | 8.028E−04 |
| A8 | −2.547E−04 | 0.000E+00 | 0.000E+00 | −1.292E−03 | −3.708E−03 | 1.491E−04 | 0.000E+00 |
| A10 | 0.000E+00 | 0.000E+00 | 0.000E+00 | 3.580E−04 | 1.654E−04 | −4.066E−05 | 0.000E+00 |
| A12 | 0.000E+00 | 0.000E+00 | 0.000E+00 | 0.000E+00 | 0.000E+00 | 2.608E−05 | 0.000E+00 |
| A14 | 0.000E+00 | 0.000E+00 | 0.000E+00 | 0.000E+00 | 0.000E+00 | −3.572E−06 | 0.000E+00 |
| A16 | 0.000E+00 | 0.000E+00 | 0.000E+00 | 0.000E+00 | 0.000E+00 | 0.000E+00 | 0.000E+00 |

TABLE 1-continued

|  | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −9.155E−01 | 0.000E+00 | 0.000E+00 | 0.000E+00 | 0.000E+00 |
| A4 | 6.539E−03 | 1.499E−02 | −3.441E−04 | −1.147E−02 | −8.992E−03 | −7.734E−03 | −1.090E−02 |
| A6 | 2.180E−03 | −2.367E−05 | 1.650E−04 | 1.505E−04 | −2.031E−05 | 2.167E−04 | 4.282E−04 |
| A8 | 0.000E+00 | 1.447E−04 | −5.051E−05 | −1.898E−05 | 6.071E−06 | 0.000E+00 | −5.608E−06 |
| A10 | 0.000E+00 | 0.000E+00 | 0.000E+00 | 0.000E+00 | −3.533E−07 | 0.000E+00 | −2.129E−07 |
| A12 | 0.000E+00 | 0.000E+00 | 0.000E+00 | 0.000E+00 | 0.000E+00 | 0.000E+00 | 5.359E−09 |
| A14 | 0.000E+00 | 0.000E+00 | 0.000E+00 | 0.000E+00 | 0.000E+00 | 0.000E+00 | 1.491E−10 |
| A16 | 0.000E+00 | 0.000E+00 | 0.000E+00 | 0.000E+00 | 0.000E+00 | 0.000E+00 | −4.371E−12 |

As shown in Table 11, the imaging lens according to Example 1 satisfies all the conditional expressions (1) to (8).

Figure 2:
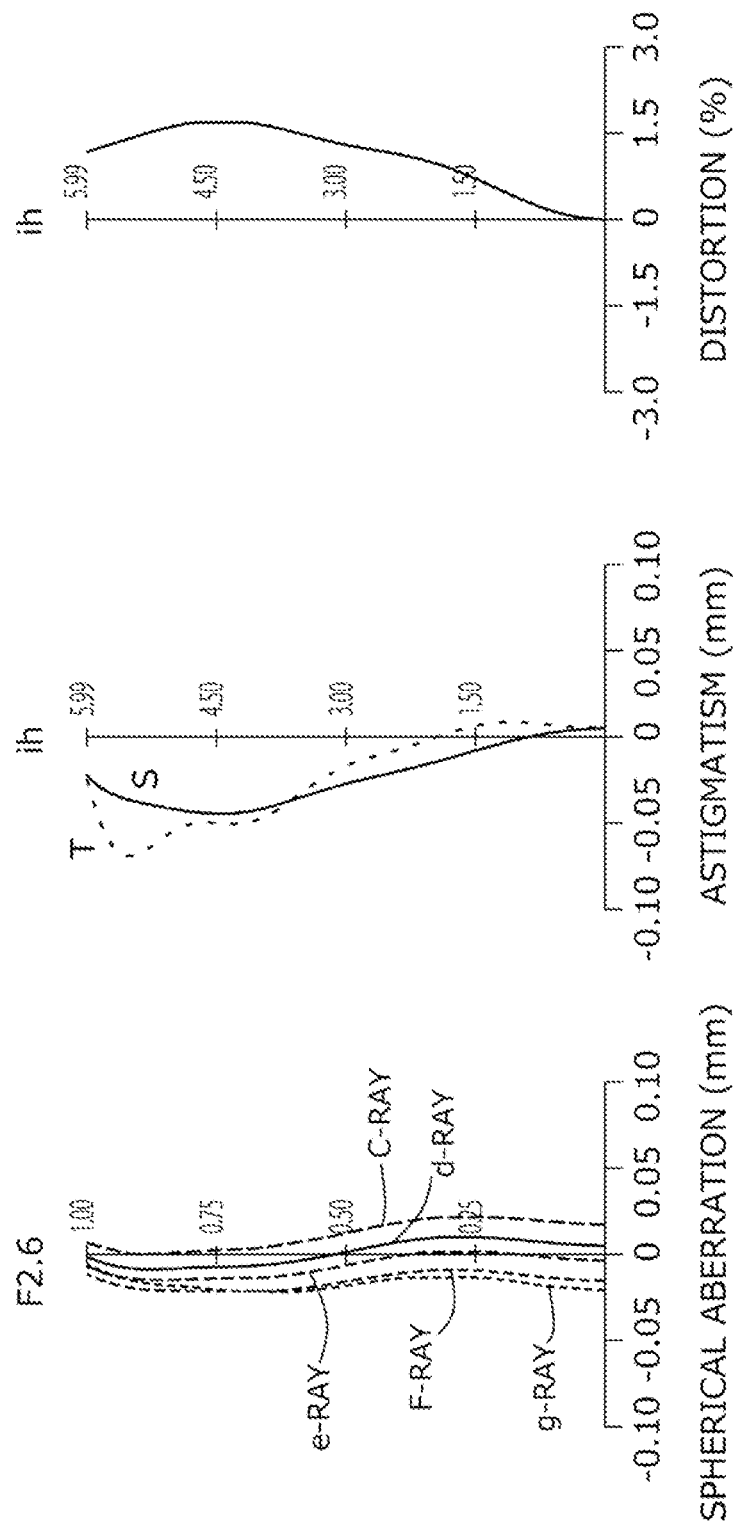
FIG. 2 shows spherical aberration, astigmatism, and distortion of the imaging lens according to Example 1 in which the object is at infinity.
Figure 3:
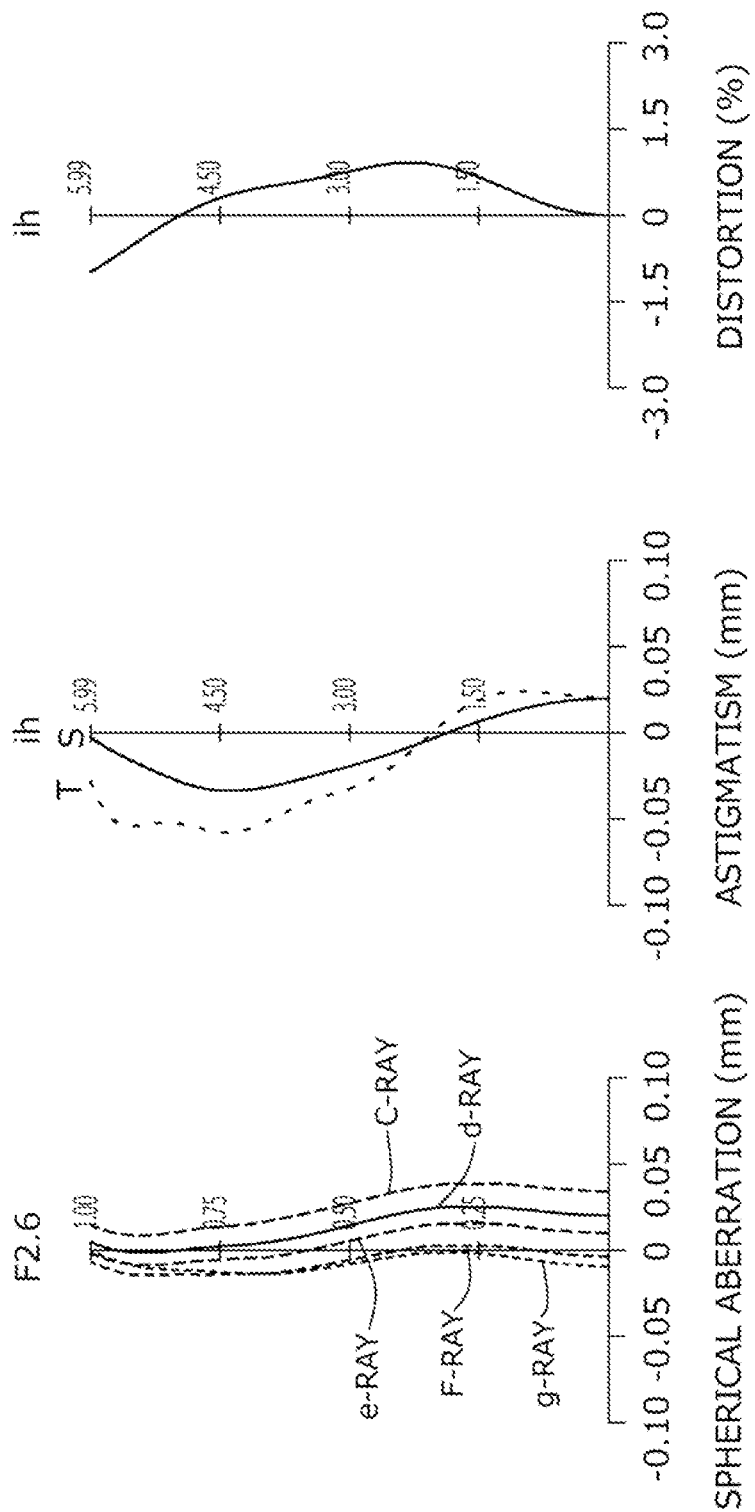
FIG. 3 shows spherical aberration, astigmatism, and distortion of the imaging lens according to Example 1 in which the distance of the object is 150 mm.
Figure 4:
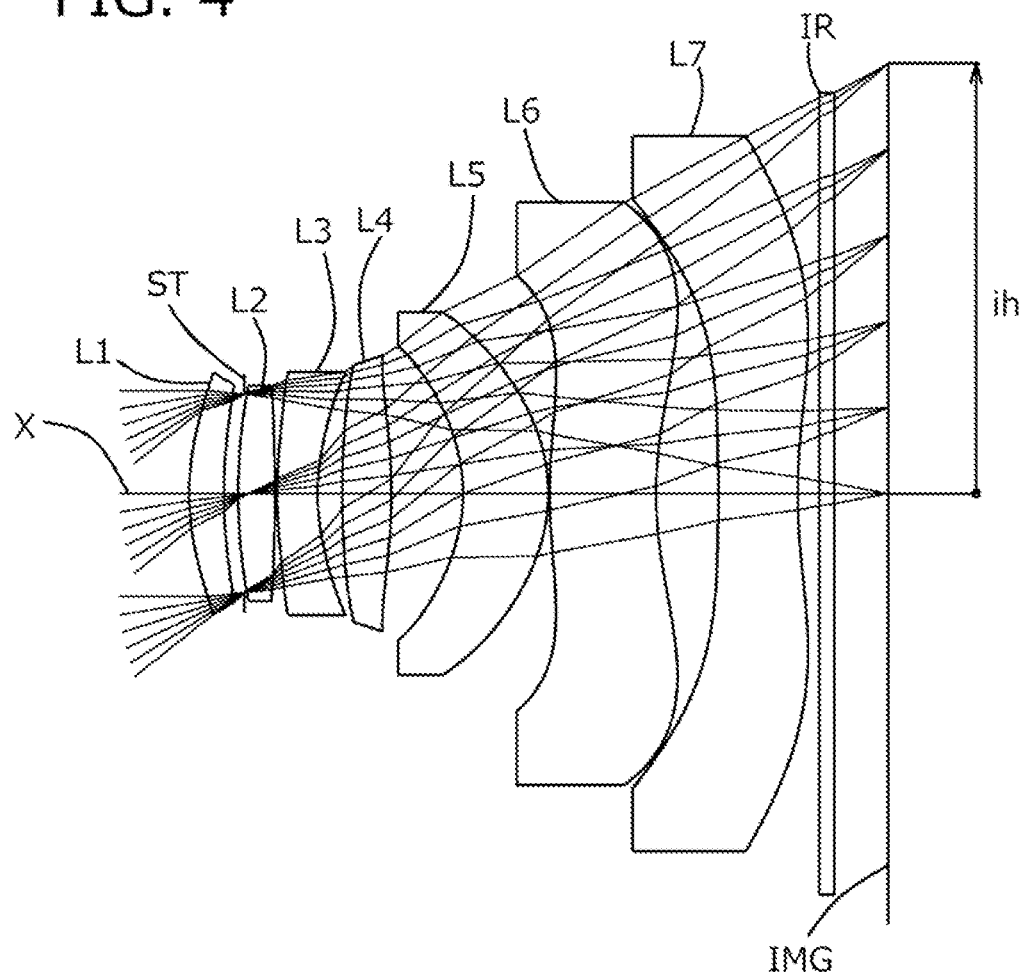
FIG. 4 is a schematic view showing the general configuration of an imaging lens according to Example 2.

FIG. 2 shows spherical aberration (mm), astigmatism (mm), and distortion (%) of the imaging lens according to Example 1 in which the object is at infinity. The spherical aberration graph shows the amount of aberration at wavelengths of g-ray (436 nm), F-ray (486 nm), e-ray (546 nm), d-ray (588 nm), and C-ray (656 nm). The astigmatism graph shows the amount of aberration on sagittal image surface S and the amount of aberration on tangential image surface T at d-ray (the same is true for FIGS. 5, 8, 11, 14, 17, 20, 23, 26, and 29). As shown in FIG. 2, various aberrations are properly corrected. FIG. 3 shows spherical aberration (mm), astigmatism (mm), and distortion (%) of the imaging lens according to Example 1 in which the entire imaging lens is extended for autofocusing and the distance of the object is 150 mm. The spherical aberration graph shows the amount of aberration at wavelengths of g-ray (436 nm), F-ray (486 nm), e-ray (546 nm), d-ray (588 nm), and C-ray (656 nm). The astigmatism graph shows the amount of aberration on sagittal image surface S and the amount of aberration on tangential image surface T at d-ray (the same is true for FIGS. 6, 9, 12, 15, 18, 21, 24, 27, and 30). As shown in FIG. 3, various aberrations are properly corrected even in imaging of an object at close range.

The imaging lens provides a wide field of view of nearly 80 degrees and relatively high brightness with an F-value of 2.6. The ratio of total track length TTL to maximum image height ih (TTL/2ih) is 0.82, so it offers a compact design though it uses seven constituent lenses.

Example 2

The basic lens data of Example 2 is shown below in Table 2.

TABLE 2

Example 2
in mm
f = 7.47
Fno = 2.6
ω(°) = 38.3
ih = 5.99
TTL = 9.65

Surface Data

| Surface No. i (Object Surface) | Curvature Radius r Infinity | Surface Distance d Infinity | Refractive Index Nd | Abbe Number νd |
|---|---|---|---|---|
| 1* | 3.712 | 0.48 | 1.543812 | 55.5699 |
| 2* | 6.560 | 0.280 | | |
| 3 (Stop) | Infinity | −0.080 | | |
| 4* | 8.676 | 0.510 | 1.5438 | 55.57 |
| 5* | −28.537 | 0.029 | | |
| 6* | 5.944 | 0.564 | 1.6349 | 23.97 |
| 7* | 3.045 | 0.343 | | |
| 8* | 12.794 | 0.681 | 1.5438 | 55.57 |
| 9* | −7.984 | 0.998 | | |
| 10* | −2.392 | 1.186 | 1.5438 | 55.57 |
| 11* | −2.386 | 0.021 | | |
| 12* | 7.769 | 1.476 | 1.5438 | 55.57 |
| 13* | 5.147 | 0.864 | | |
| 14* | −62.288 | 1.105 | 1.6142 | 25.58 |
| 15* | 7.497 | 0.295 | | |
| 16 | Infinity | 0.210 | 1.5168 | 64.20 |
| 17 | Infinity | 0.750 | | |
| Image Plane | Infinity | | | |

Constituent Lens Data

| Lens | Start Surface | Focal Length |
|---|---|---|
| 1 | 1 | 14.84 |
| 2 | 4 | 12.29 |
| 3 | 6 | −10.63 |
| 4 | 8 | 9.15 |
| 5 | 10 | 24.78 |

TABLE 2-continued

| | | |
|---|---|---|
| 6 | 12 | −34.98 |
| 7 | 14 | −10.83 |

| Lens | Composite Focal Length |
|---|---|
| First Lens-Second Lens | 6.97 |
| Fourth Lens-Fifth Lens | 7.98 |
| Sixth Lens-Seventh Lens | −8.43 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −2.947E+01 | −6.483E+00 | 0.000E+00 |
| A4 | −5.802E−03 | −7.443E−03 | 4.772E−03 | 2.916E−03 | −7.007E−03 | −1.314E−03 | 5.325E−04 |
| A6 | −6.602E−04 | 4.272E−04 | −8.917E−04 | −1.288E−03 | −4.097E−05 | 1.491E−03 | 8.206E−04 |
| A8 | −1.594E−04 | 0.000E+00 | 0.000E+00 | −1.301E−03 | 1.627E−04 | 1.157E−04 | 0.000E+00 |
| A10 | 0.000E+00 | 0.000E+00 | 0.000E+00 | 4.056E−04 | 1.594E−04 | −4.045E−05 | 0.000E+00 |
| A12 | 0.000E+00 | 0.000E+00 | 0.000E+00 | 0.000E+00 | 0.000E+00 | 2.816E−05 | 0.000E+00 |
| A14 | 0.000E+00 | 0.000E+00 | 0.000E+00 | 0.000E+00 | 0.000E+00 | −3.481E−06 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −1.009E+00 | 0.000E+00 | 0.000E+00 | 0.000E+00 | 0.000E+00 |
| A4 | 3.947E−03 | 1.560E−02 | −4.529E−05 | −1.290E−02 | −1.005E−02 | −5.997E−03 | −9.601E−03 |
| A6 | 1.154E−03 | −5.492E−04 | 1.183E−04 | 3.363E−04 | 1.892E−04 | 1.359E−04 | 3.703E−04 |
| A8 | 0.000E+00 | 5.607E−05 | −1.005E−04 | −3.456E−05 | −5.343E−06 | 0.000E+00 | −5.393E−06 |
| A10 | 0.000E+00 | 0.000E+00 | 0.000E+00 | 0.000E+00 | −1.581E−07 | 0.000E+00 | −1.896E−07 |
| A12 | 0.000E+00 | 0.000E+00 | 0.000E+00 | 0.000E+00 | 0.000E+00 | 0.000E+00 | 5.631E−09 |
| A14 | 0.000E+00 | 0.000E+00 | 0.000E+00 | 0.000E+00 | 0.000E+00 | 0.000E+00 | 1.437E−10 |
| A16 | 0.000E+00 | 0.000E+00 | 0.000E+00 | 0.000E+00 | 0.000E+00 | 0.000E+00 | −4.749E−12 |

As shown in Table 11, the imaging lens according to Example 2 satisfies all the conditional expressions (1) to (8).

Figure 5:
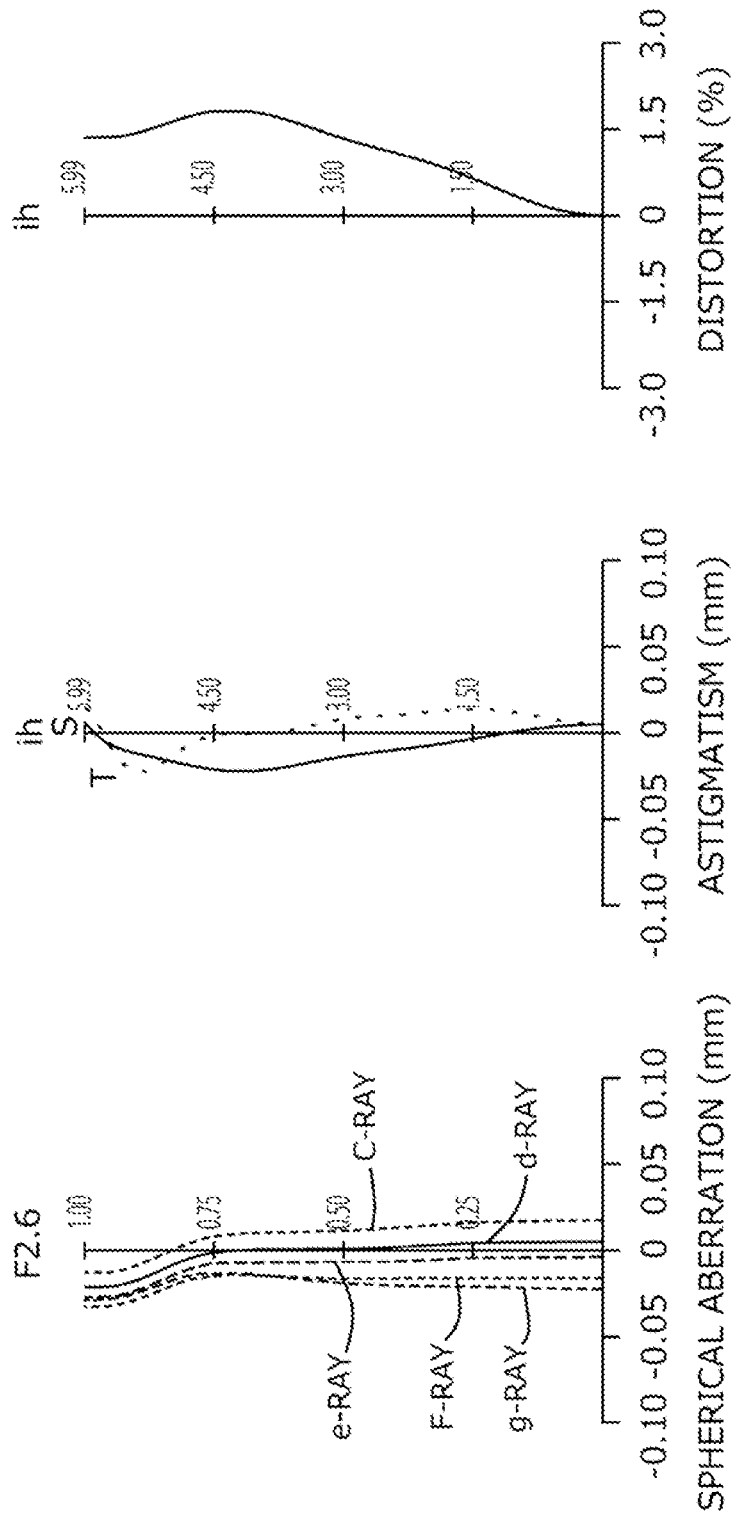
FIG. 5 shows spherical aberration, astigmatism, and distortion of the imaging lens according to Example 2 in which the object is at infinity.
Figure 6:
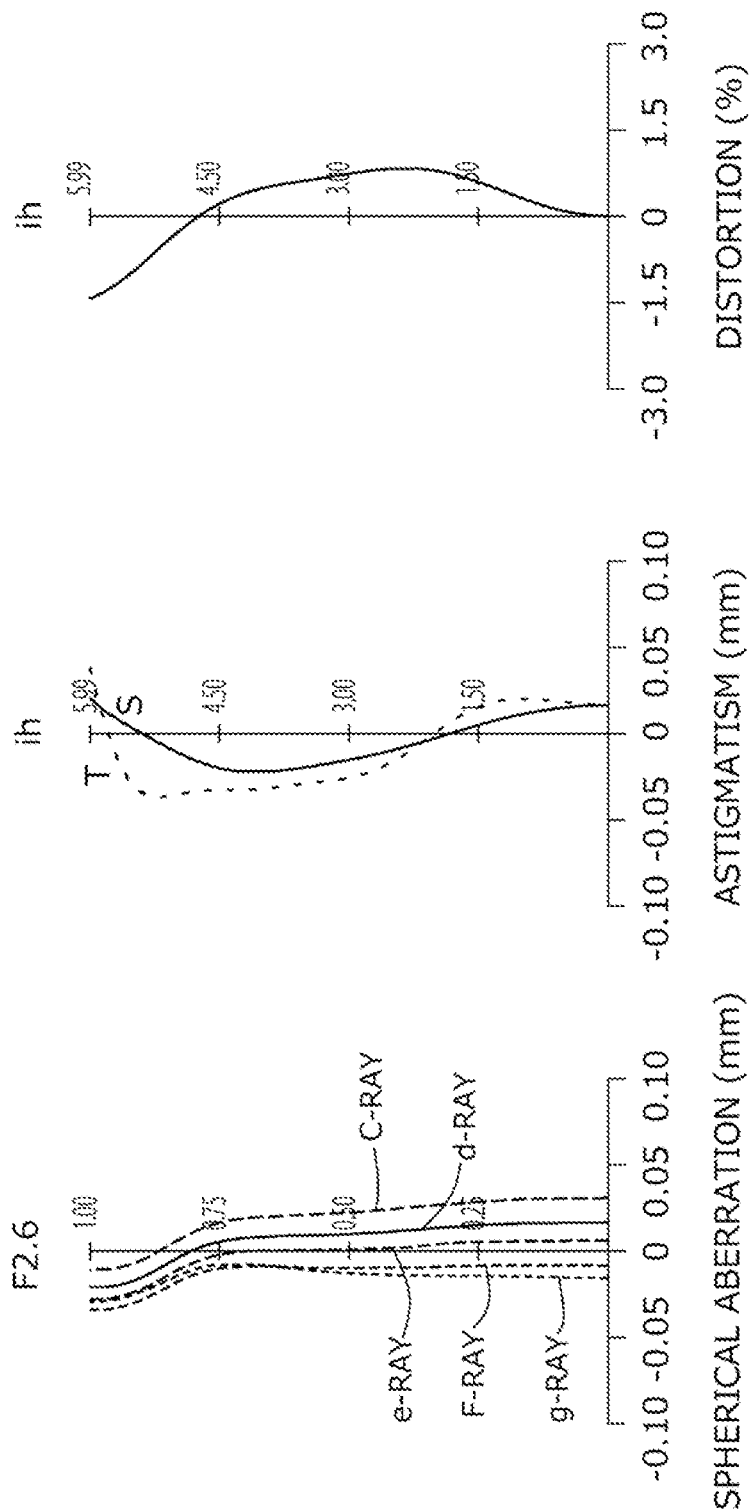
FIG. 6 shows spherical aberration, astigmatism, and distortion of the imaging lens according to Example 2 in which the distance of the object is 150 mm.
Figure 7:
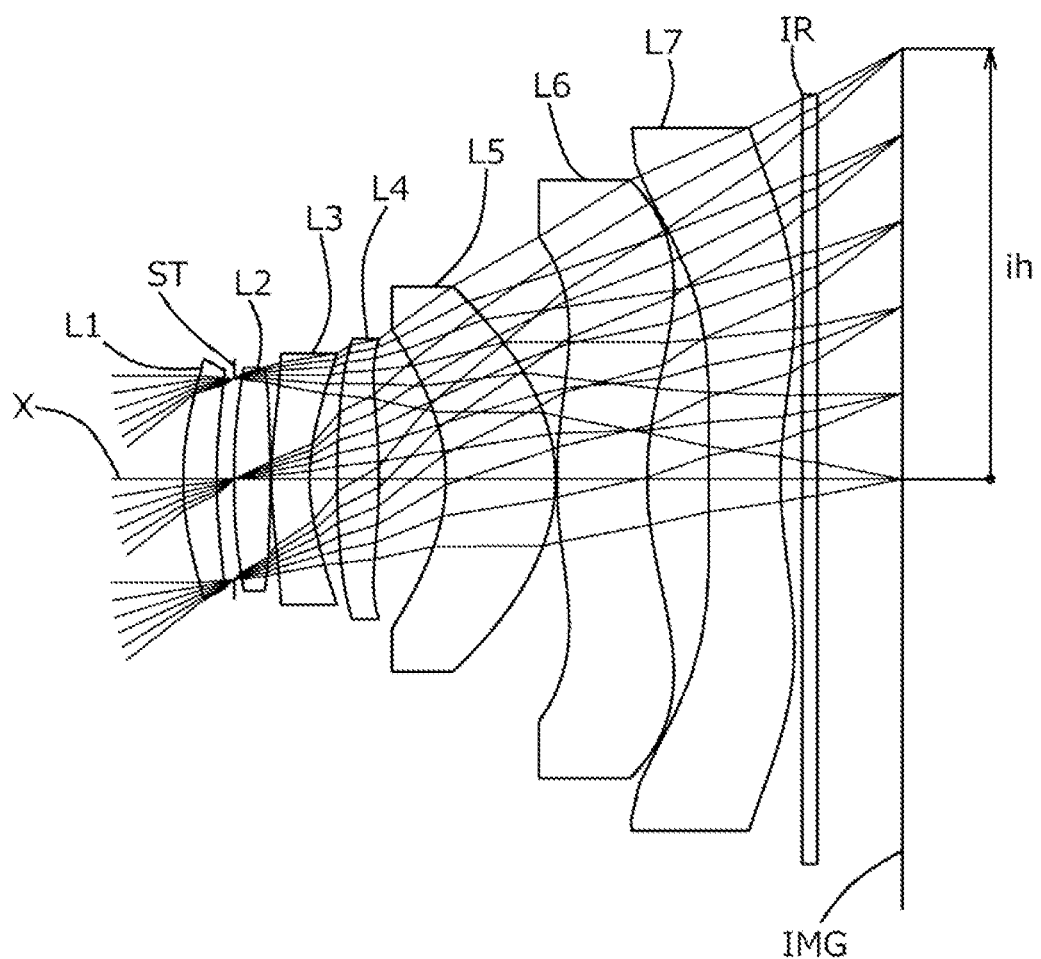
FIG. 7 is a schematic view showing the general configuration of an imaging lens according to Example 3.

FIG. 5 shows various aberrations of the imaging lens according to Example 2 in which the object is at infinity, and FIG. 6 shows various aberrations of the imaging lens according to Example 2 in which the entire imaging lens is extended for autofocusing and the distance of the object is 150 mm. As shown in FIGS. 5 and 6, various aberrations are corrected properly.

The imaging lens provides a wide field of view of nearly 80 degrees and relatively high brightness with an F-value of 2.6. The ratio of total track length TTL to maximum image height ih (TTL/2ih) is 0.80, so it offers a compact design though it uses seven constituent lenses.

Example 3

The basic lens data of Example 3 is shown below in Table 3.

TABLE 3

Example 3
in mm
f = 7.51
Fno = 2.6
ω(°) = 37.7
ih = 5.99
TTL = 9.93

Surface Data

| Surface No. i (Object Surface) | Curvature Radius r Infinity | Surface Distance d Infinity | Refractive Index Nd | Abbe Number vd |
|---|---|---|---|---|
| 1* | 4.135 | 0.468 | 1.5438 | 55.57 |
| 2* | 8.081 | 0.237 | | |
| 3 (Stop) | Infinity | 0.000 | | |
| 4* | 9.482 | 0.504 | 1.5438 | 55.57 |
| 5* | −22.482 | 0.018 | | |
| 6* | 5.240 | 0.531 | 1.6349 | 23.97 |
| 7* | 2.805 | 0.385 | | |
| 8* | 13.532 | 0.577 | 1.5438 | 55.57 |
| 9* | −8.307 | 0.931 | | |
| 10* | −2.499 | 1.525 | 1.5438 | 55.57 |
| 11* | −2.502 | 0.020 | | |
| 12* | 5.829 | 1.256 | 1.5438 | 55.57 |
| 13* | 4.686 | 0.852 | | |
| 14* | 42.9885 | 1.003 | 1.6142 | 25.58 |
| 15* | 6.076 | 0.300 | | |

TABLE 3-continued

| | | | | |
|---|---|---|---|---|
| 16 | Infinity | 0.210 | 1.5168 | 64.20 |
| 17 | Infinity | 1.175 | | |
| Image Plane | Infinity | Infinity | | |

Constituent Lens Data

| Lens | Start Surface | Focal Length |
|---|---|---|
| 1 | 1 | 14.94 |
| 2 | 4 | 12.33 |
| 3 | 6 | −10.38 |
| 4 | 8 | 9.55 |
| 5 | 10 | 21.52 |
| 6 | 12 | −71.69 |
| 7 | 14 | −11.64 |

| Lens | Composite Focal Length |
|---|---|
| First Lens-Second Lens | 7.00 |
| Fourth Lens-Fifth Lens | 8.10 |
| Sixth Lens-Seventh Lens | −10.50 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −2.524E+01 | −6.329E+00 | 0.000E+00 |
| A4 | −4.543E−03 | −5.877E−03 | 3.955E−03 | 3.611E−03 | −6.488E−03 | −2.996E−03 | 1.251E−03 |
| A6 | −8.319E−04 | −1.569E−04 | −7.688E−04 | −2.045E−03 | −9.311E−04 | 3.512E−04 | 9.098E−04 |
| A8 | −2.061E−04 | 0.000E+00 | 0.000E+00 | −1.205E−03 | −1.790E−04 | 1.065E−04 | 0.000E+00 |
| A10 | 0.000E+00 | 0.000E+00 | 0.000E+00 | 3.101E−04 | 1.416E−04 | −6.606E−05 | 0.000E+00 |
| A12 | 0.000E+00 | 0.000E+00 | 0.000E+00 | 0.000E+00 | 0.000E+00 | 2.286E−05 | 0.000E+00 |
| A14 | 0.000E+00 | 0.000E+00 | 0.000E+00 | 0.000E+00 | 0.000E+00 | −3.032E−06 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −9.535E−01 | 0.000E+00 | 0.000E+00 | 0.000E+00 | 0.000E+00 |
| A4 | 7.155E−03 | 1.606E−02 | 2.462E−05 | −1.209E−02 | −9.586E−03 | −7.462E−03 | −1.150E−02 |
| A6 | 2.436E−03 | −1.064E−04 | 8.496E−05 | 1.609E−04 | 1.332E−06 | 2.137E−04 | 4.407E−04 |
| A8 | 0.000E+00 | 2.067E−04 | 0.000E+00 | 0.000E+00 | 8.035E−06 | 0.000E+00 | −6.069E−06 |
| A10 | 0.000E+00 | 0.000E+00 | 0.000E+00 | 0.000E+00 | −4.396E−07 | 0.000E+00 | −1.892E−07 |
| A12 | 0.000E+00 | 0.000E+00 | 0.000E+00 | 0.000E+00 | 0.000E+00 | 0.000E+00 | 5.041E−09 |
| A14 | 0.000E+00 | 0.000E+00 | 0.000E+00 | 0.000E+00 | 0.000E+00 | 0.000E+00 | 1.425E−10 |
| A16 | 0.000E+00 | 0.000E+00 | 0.000E+00 | 0.000E+00 | 0.000E+00 | 0.000E+00 | −4.420E−12 |

As shown in Table 11, the imaging lens according to Example 3 satisfies all the conditional expressions (1) to (8).

Figure 8:
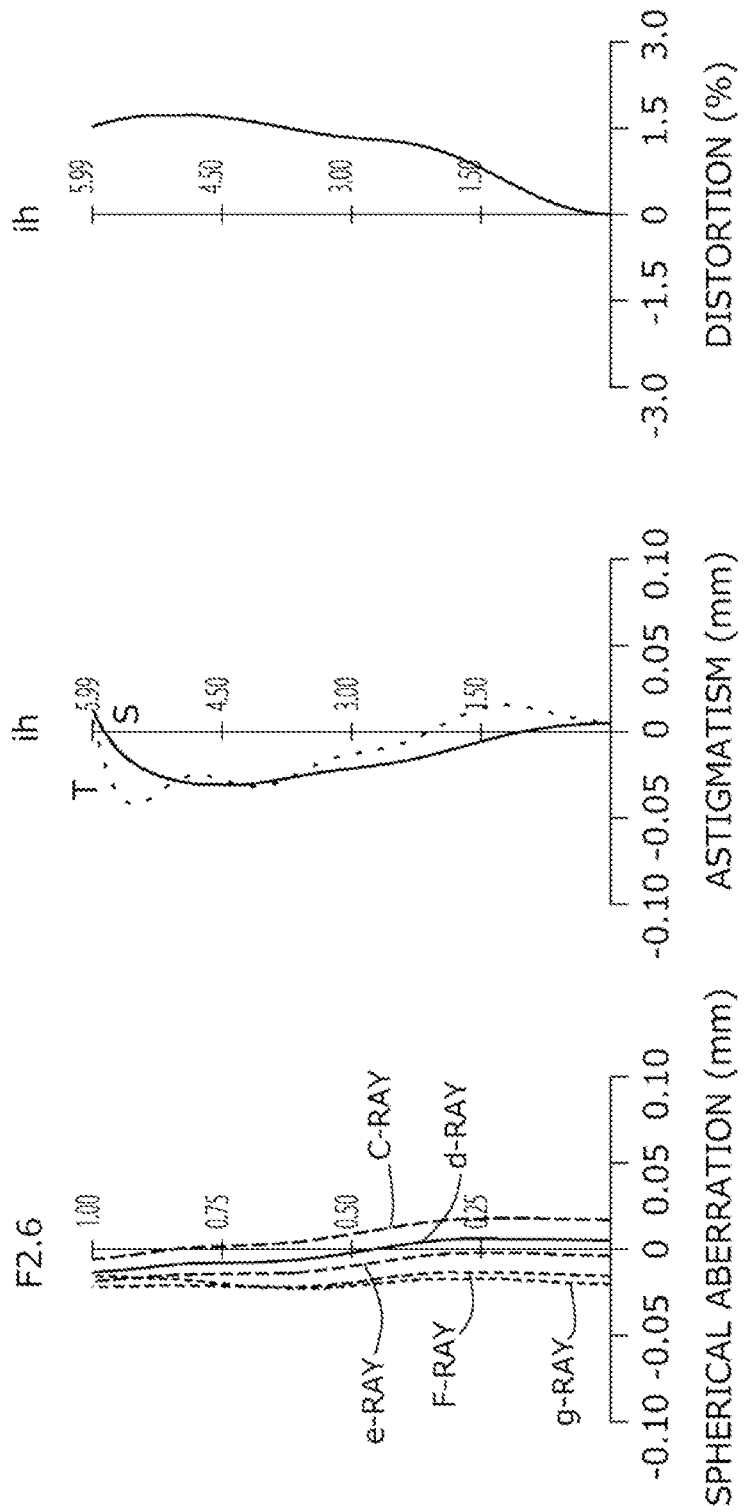
FIG. 8 shows spherical aberration, astigmatism, and distortion of the imaging lens according to Example 3 in which the object is at infinity.
Figure 9:
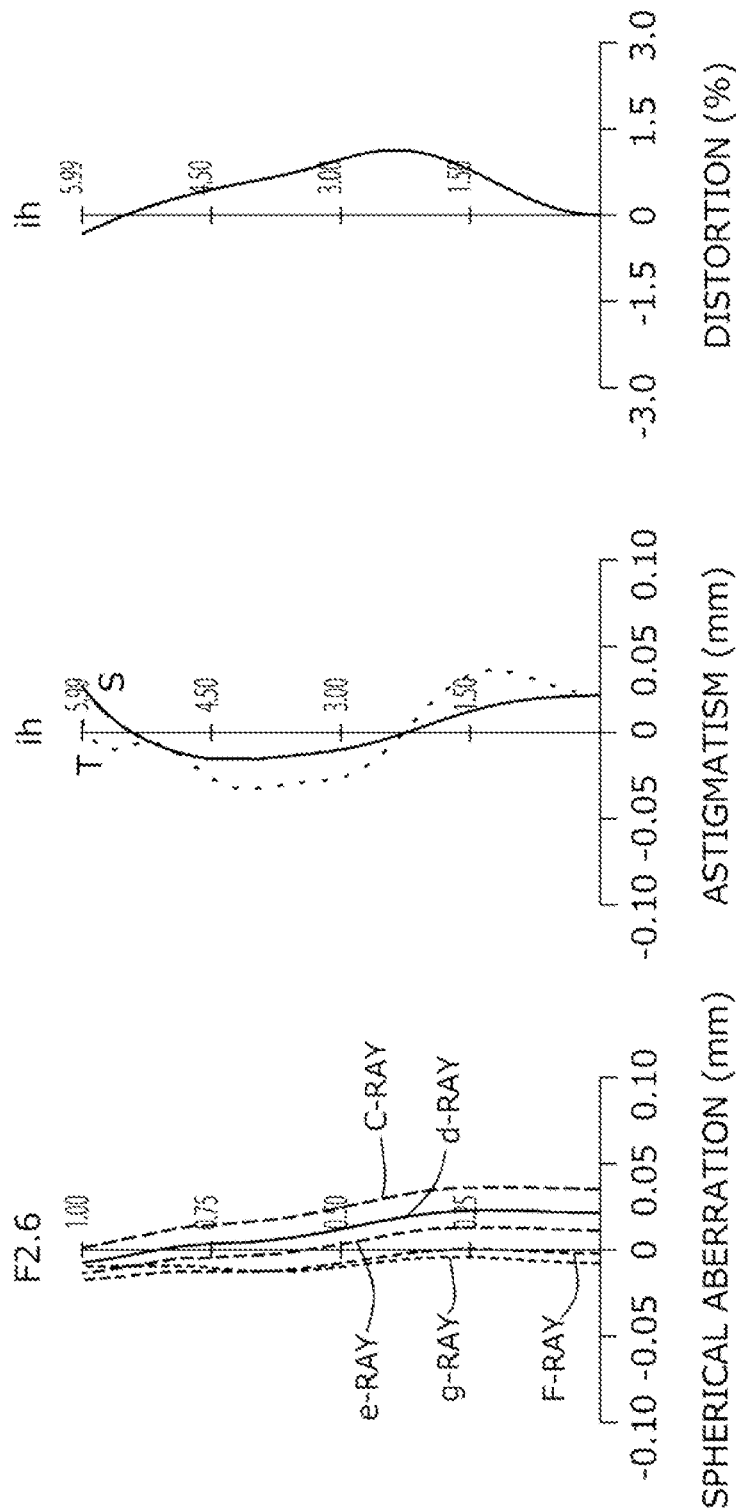
FIG. 9 shows spherical aberration, astigmatism, and distortion of the imaging lens according to Example 3 in which the distance of the object is 150 mm.
Figure 10:
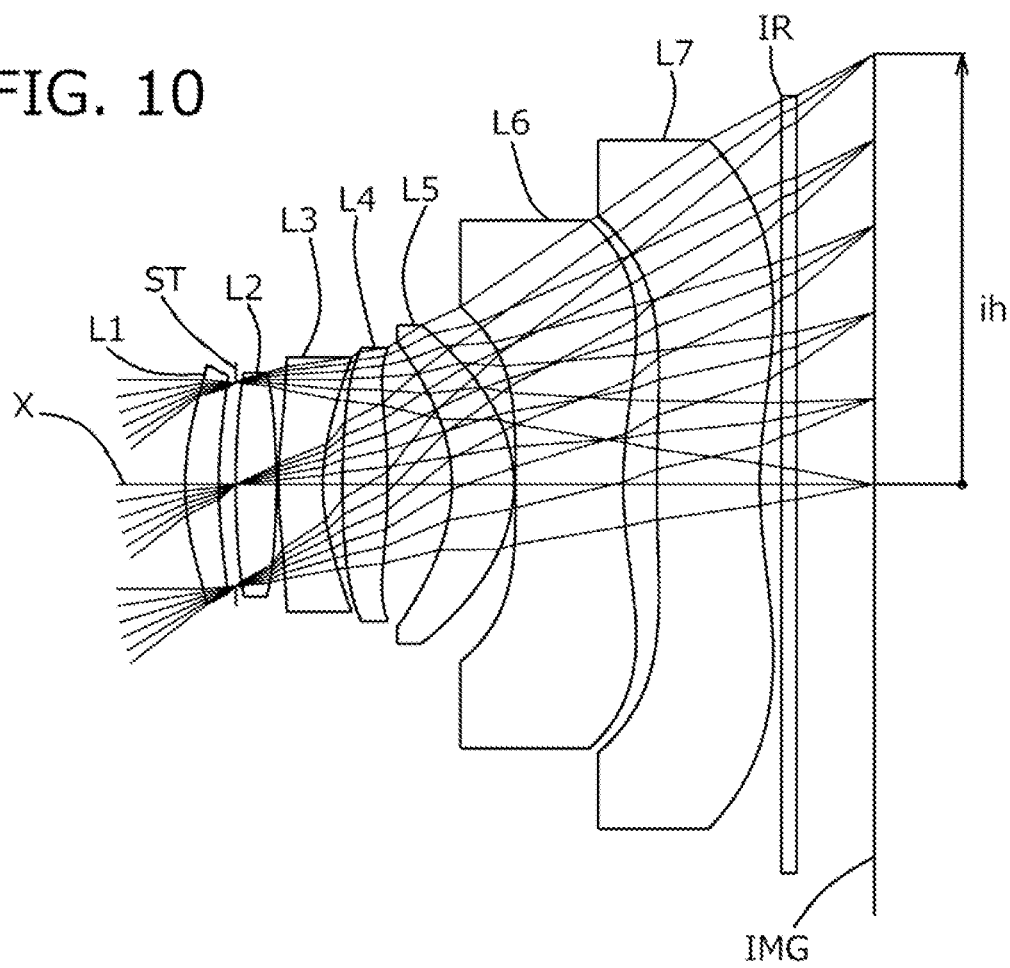
FIG. 10 is a schematic view showing the general configuration of an imaging lens according to Example 4.

FIG. 8 shows various aberrations of the imaging lens according to Example 3 in which the object is at infinity, and FIG. 9 shows various aberrations of the imaging lens according to Example 3 in which the entire imaging lens is extended for autofocusing and the distance of the object is 150 mm. As shown in FIGS. 8 and 9, various aberrations are corrected properly.

The imaging lens provides a wide field of view of nearly 80 degrees and relatively high brightness with an F-value of 2.6. The ratio of total track length TTL to maximum image height ih (TTL/2ih) is 0.83, so it offers a compact design though it uses seven constituent lenses.

Example 4

The basic lens data of Example 4 is shown below in Table 4.

TABLE 4

Example 4
in mm
f = 7.61
Fno = 2.6
ω(°) = 37.7
ih = 5.99
TTL = 9.51

Surface Data

| Surface No. i (Object Surface) | Curvature Radius r Infinity | Surface Distance d Infinity | Refractive Index Nd | Abbe Number Vd |
|---|---|---|---|---|
| 1* | 3.672 | 0.468 | 1.5438 | 55.57 |
| 2* | 7.066 | 0.237 | | |
| 3 (Stop) | Infinity | 0.000 | | |

TABLE 4-continued

| | | | | |
|---|---|---|---|---|
| 4* | 16.245 | 0.564 | 1.5438 | 55.57 |
| 5* | −10.566 | 0.027 | | |
| 6* | 5.401 | 0.617 | 1.6349 | 23.97 |
| 7* | 2.789 | 0.272 | | |
| 8* | 11.800 | 0.629 | 1.5438 | 55.57 |
| 9* | −7.986 | 0.893 | | |
| 10* | −2.371 | 0.863 | 1.5438 | 55.57 |
| 11* | −2.046 | 0.020 | | |
| 12* | −100.000 | 1.500 | 1.5438 | 55.57 |
| 13* | 6.099 | 0.467 | | |
| 14* | 21.2943 | 1.432 | 1.6142 | 25.58 |
| 15* | 6.59893 | 0.300 | | |
| 16 | Infinity | 0.210 | 1.5168 | 64.20 |
| 17 | Infinity | 1.073 | | |
| Image Plane | Infinity | | | |

Constituent Lens Data

| Lens | Start Surface | Focal Length |
|---|---|---|
| 1 | 1 | 13.41 |
| 2 | 4 | 11.86 |
| 3 | 6 | −10.00 |
| 4 | 8 | 8.86 |
| 5 | 10 | 14.19 |
| 6 | 12 | −10.52 |
| 7 | 14 | −16.17 |

| Lens | Composite Focal Length |
|---|---|
| First Lens-Second Lens | 6.57 |
| Fourth Lens-Fifth Lens | 6.32 |
| Sixth Lens-Seventh Lens | −5.96 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | 0.000E+00 | −2.781E+01 | −6.245E+00 |
| A4 | −7.243E−03 | −8.036E−03 | 6.777E−03 | 4.089E−03 | −8.671E−03 | −3.634E−03 | 1.804E−03 |
| A6 | −1.196E−03 | 4.251E−04 | −3.233E−04 | −1.658E−03 | −1.175E−03 | 3.845E−04 | 1.788E−03 |
| A8 | −2.487E−04 | 0.000E+00 | 0.000E+00 | −1.412E−03 | −1.205E−04 | 3.638E−04 | 0.000E+00 |
| A10 | 0.000E+00 | 0.000E+00 | 0.000E+00 | 3.585E−04 | 1.833E−04 | −1.502E−04 | 0.000E+00 |
| A12 | 0.000E+00 | 0.000E+00 | 0.000E+00 | 0.000E+00 | 0.000E+00 | 3.800E−05 | 0.000E+00 |
| A14 | 0.000E+00 | 0.000E+00 | 0.000E+00 | 0.000E+00 | 0.000E+00 | −3.187E−06 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | 0.000E+00 | −8.619E−01 | 0.000E+00 | 0.000E+00 | 0.000E+00 |
| A4 | 5.027E−03 | 1.397E−02 | −1.659E−03 | −2.042E−02 | −1.047E−02 | −4.950E−03 | −1.021E−02 |
| A6 | 3.568E−03 | 6.744E−04 | 3.830E−05 | 9.069E−05 | 4.616E−05 | −6.761E−05 | 4.330E−04 |
| A8 | 0.000E+00 | 2.283E−04 | 0.000E+00 | 0.000E+00 | 1.050E−05 | 0.000E+00 | −6.954E−06 |
| A10 | 0.000E+00 | 0.000E+00 | 0.000E+00 | 0.000E+00 | −6.458E−07 | 0.000E+00 | −4.368E−07 |
| A12 | 0.000E+00 | 0.000E+00 | 0.000E+00 | 0.000E+00 | 0.000E+00 | 0.000E+00 | 1.414E−08 |
| A14 | 0.000E+00 | 0.000E+00 | 0.000E+00 | 0.000E+00 | 0.000E+00 | 0.000E+00 | 2.236E−10 |
| A16 | 0.000E+00 | 0.000E+00 | 0.000E+00 | 0.000E+00 | 0.000E+00 | 0.000E+00 | −9.606E−12 |

As shown in Table 11, the imaging lens according to Example 4 satisfies all the conditional expressions (1) to (8).

Figure 11:
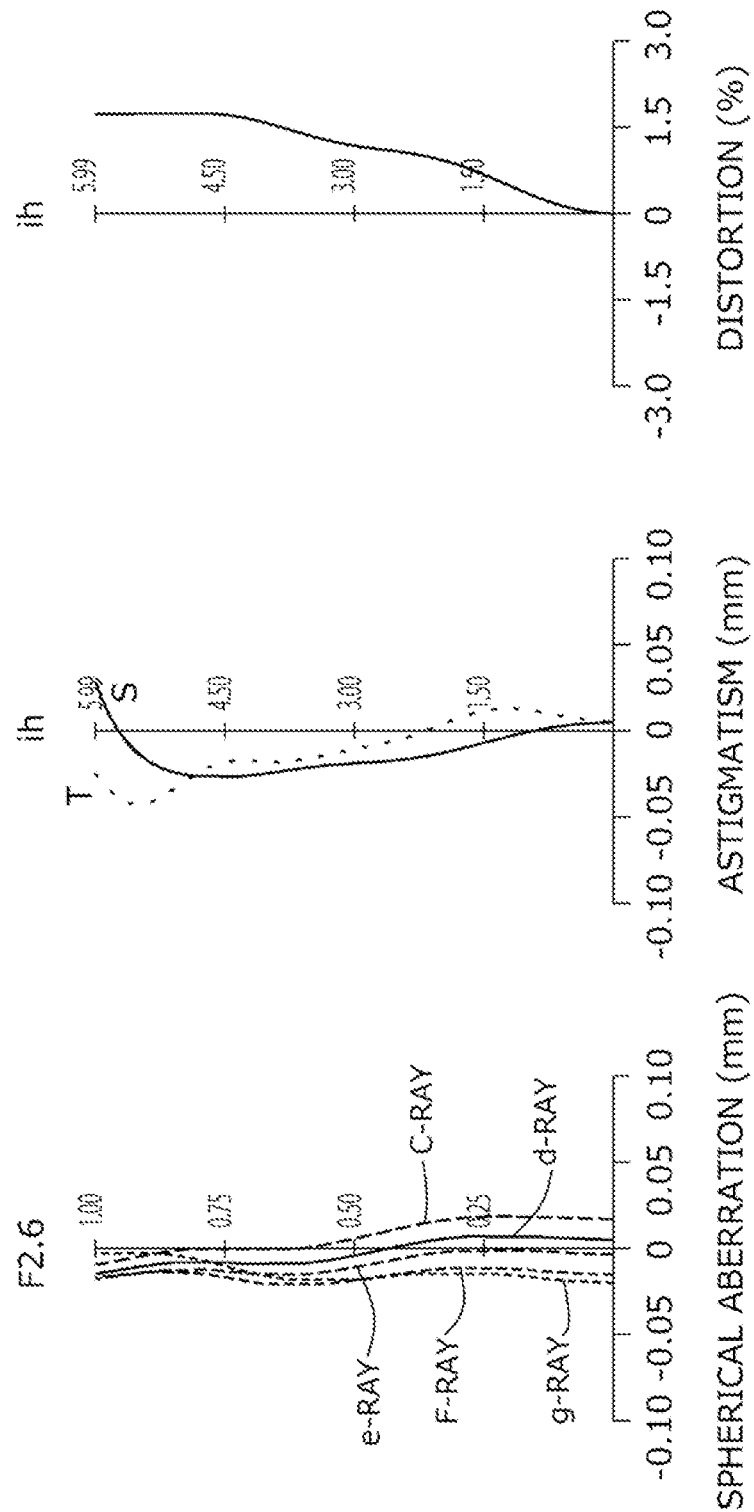
FIG. 11 shows spherical aberration, astigmatism, and distortion of the imaging lens according to Example 4 in which the object is at infinity.
Figure 12:
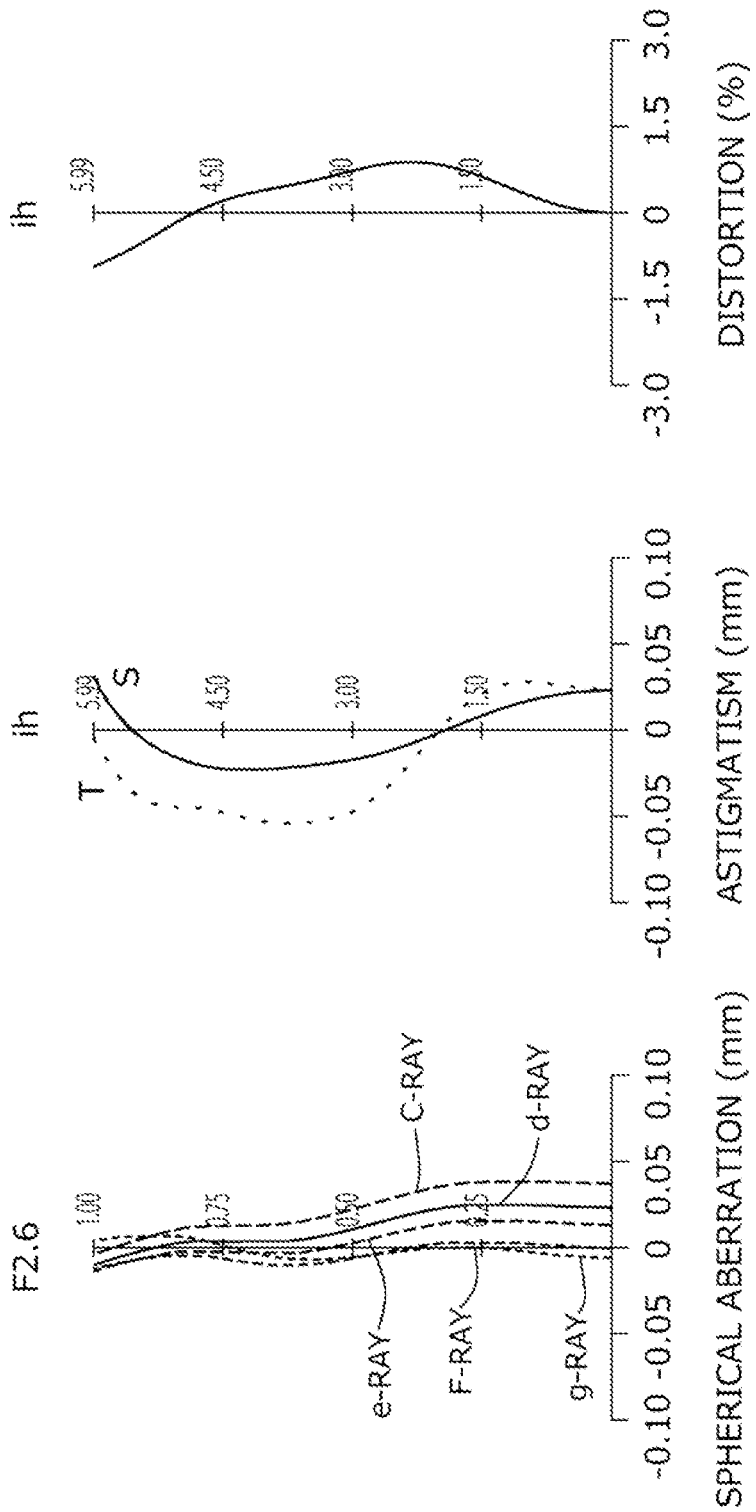
FIG. 12 shows spherical aberration, astigmatism, and distortion of the imaging lens according to Example 4 in which the distance of the object is 150 mm.
Figure 13:
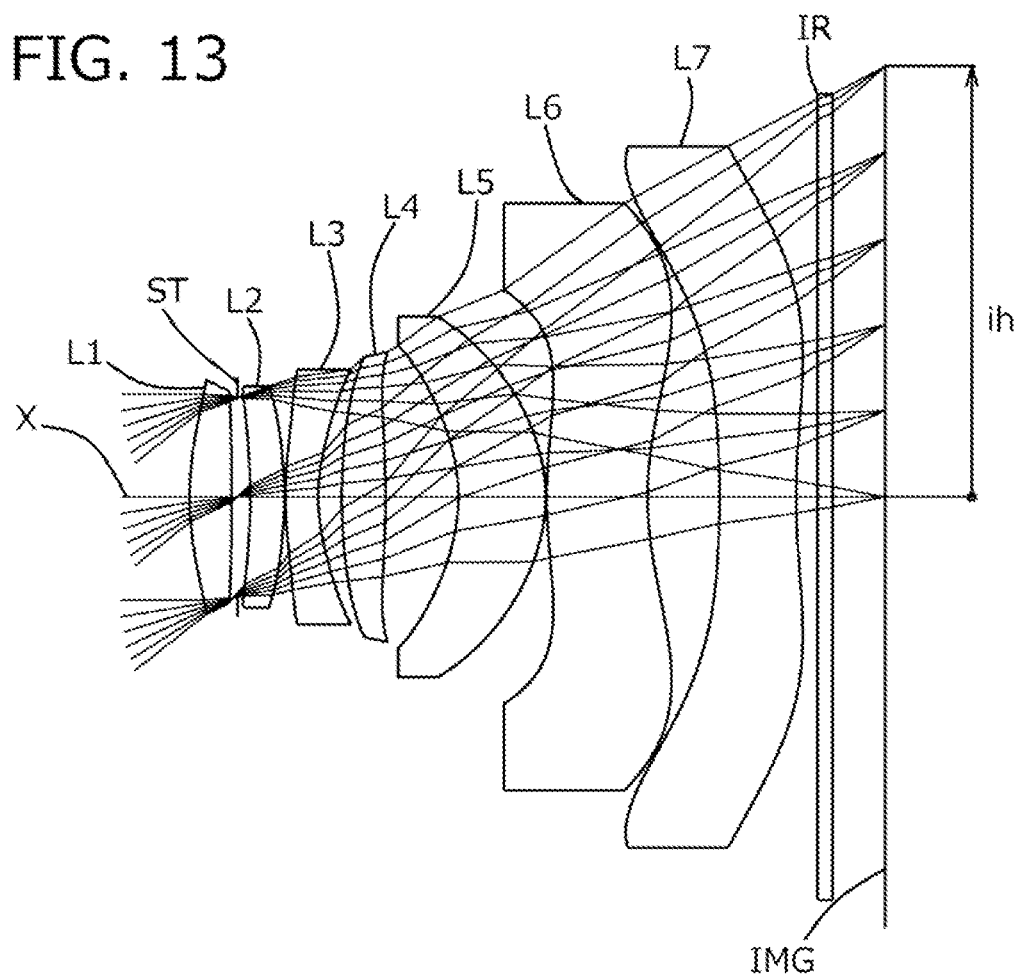
FIG. 13 is a schematic view showing the general configuration of an imaging lens according to Example 5.

FIG. 11 shows various aberrations of the imaging lens according to Example 4 in which the object is at infinity, and FIG. 12 shows various aberrations of the imaging lens according to Example 4 in which the entire imaging lens is extended for autofocusing and the distance of the object is 150 mm. As shown in FIGS. 11 and 12, various aberrations are corrected properly.

The imaging lens provides a wide field of view of nearly 80 degrees and relatively high brightness with an F-value of 2.6. The ratio of total track length TTL to maximum image height ih (TTL/2ih) is 0.79, so it offers a compact design though it uses seven constituent lenses.

Example 5

The basic lens data of Example 5 is shown below in Table 5.

TABLE 5

Example 5
in mm
f = 7.468
Fno = 2.6
ω(°) = 38.2
ih = 5.99
TTL = 9.60

Surface Data

| Surface No. i (Object Surface) | Curvature Radius r Infinity | Surface Distance d Infinity | Refractive Index Nd | Abbe Number vd |
|---|---|---|---|---|
| 1* | 4.438 | 0.583 | 1.5438 | 55.57 |
| 2* | −81.371 | 0.078 | | |
| 3 (Stop) | Infinity | 0.181 | | |
| 4* | −8.429 | 0.471 | 1.5438 | 55.57 |
| 5* | −6.404 | 0.018 | | |
| 6* | 4.954 | 0.457 | 1.6349 | 23.97 |
| 7* | 2.639 | 0.326 | | |
| 8* | 7.860 | 0.608 | 1.5438 | 55.57 |
| 9* | −13.100 | 1.013 | | |
| 10* | −2.514 | 1.211 | 1.5438 | 55.57 |
| 11* | −2.409 | 0.018 | | |
| 12* | 6.622 | 1.401 | 1.5438 | 55.57 |
| 13* | 4.469 | 0.998 | | |
| 14* | −18.3113 | 1.067 | 1.5438 | 55.57 |
| 15* | 9.054 | 0.300 | | |
| 16 | Infinity | 0.210 | 1.5168 | 64.20 |
| 17 | Infinity | 0.722 | | |
| Image Plane | Infinity | | | |

Constituent Lens Data

| Lens | Start Surface | Focal Length |
|---|---|---|
| 1 | 1 | 7.76 |
| 2 | 4 | 45.29 |
| 3 | 6 | −9.63 |
| 4 | 8 | 9.13 |
| 5 | 10 | 20.92 |
| 6 | 12 | −32.79 |
| 7 | 14 | −10.99 |

| Lens | Composite Focal Length |
|---|---|
| First Lens-Second Lens | 6.85 |
| Fourth Lens-Fifth Lens | 7.61 |
| Sixth Lens-Seventh Lens | −8.42 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −3.107E+01 | −6.796E+00 | 0.000E+00 |
| A4 | −5.673E−03 | −6.387E−03 | 7.637E−03 | 1.841E−03 | −8.302E−03 | −1.430E−03 | −9.968E−04 |
| A6 | −1.785E−03 | 6.113E−04 | −1.213E−03 | −1.413E−03 | −2.961E−04 | 1.611E−03 | 1.488E−03 |
| A8 | −1.141E−04 | 0.000E+00 | 0.000E+00 | −1.383E−03 | 2.601E−04 | 6.243E−05 | 0.000E+00 |
| A10 | 0.000E+00 | 0.000E+00 | 0.000E+00 | 3.647E−04 | 1.128E−04 | −9.977E−05 | 0.000E+00 |
| A12 | 0.000E+00 | 0.000E+00 | 0.000E+00 | 0.000E+00 | 0.000E+00 | 4.021E−05 | 0.000E+00 |
| A14 | 0.000E+00 | 0.000E+00 | 0.000E+00 | 0.000E+00 | 0.000E+00 | −3.481E−06 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −9.697E−01 | 0.000E+00 | 0.000E+00 | 0.000E+00 | 0.000E+00 |
| A4 | 4.100E−03 | 1.785E−02 | −4.443E−04 | −1.662E−02 | −1.310E−02 | −5.710E−03 | −9.278E−03 |
| A6 | 1.709E−03 | −7.718E−04 | 2.441E−04 | 4.257E−04 | 3.605E−04 | 1.947E−04 | 3.010E−04 |
| A8 | 0.000E+00 | 5.114E−05 | −1.432E−04 | −7.566E−05 | −1.398E−05 | 0.000E+00 | −3.688E−06 |
| A10 | 0.000E+00 | 0.000E+00 | 0.000E+00 | 0.000E+00 | −8.723E−09 | 0.000E+00 | −7.926E−08 |
| A12 | 0.000E+00 | 0.000E+00 | 0.000E+00 | 0.000E+00 | 0.000E+00 | 0.000E+00 | 4.322E−09 |

TABLE 5-continued

| | | | | | | | |
|---|---|---|---|---|---|---|---|
| A14 | 0.000E+00 | 0.000E+00 | 0.000E+00 | 0.000E+00 | 0.000E+00 | 0.000E+00 | 4.944E−11 |
| A16 | 0.000E+00 | 0.000E+00 | 0.000E+00 | 0.000E+00 | 0.000E+00 | 0.000E+00 | −3.757E−12 |

As shown in Table 11, the imaging lens according to Example 5 satisfies all the conditional expressions (1) to (8).

Figure 14:
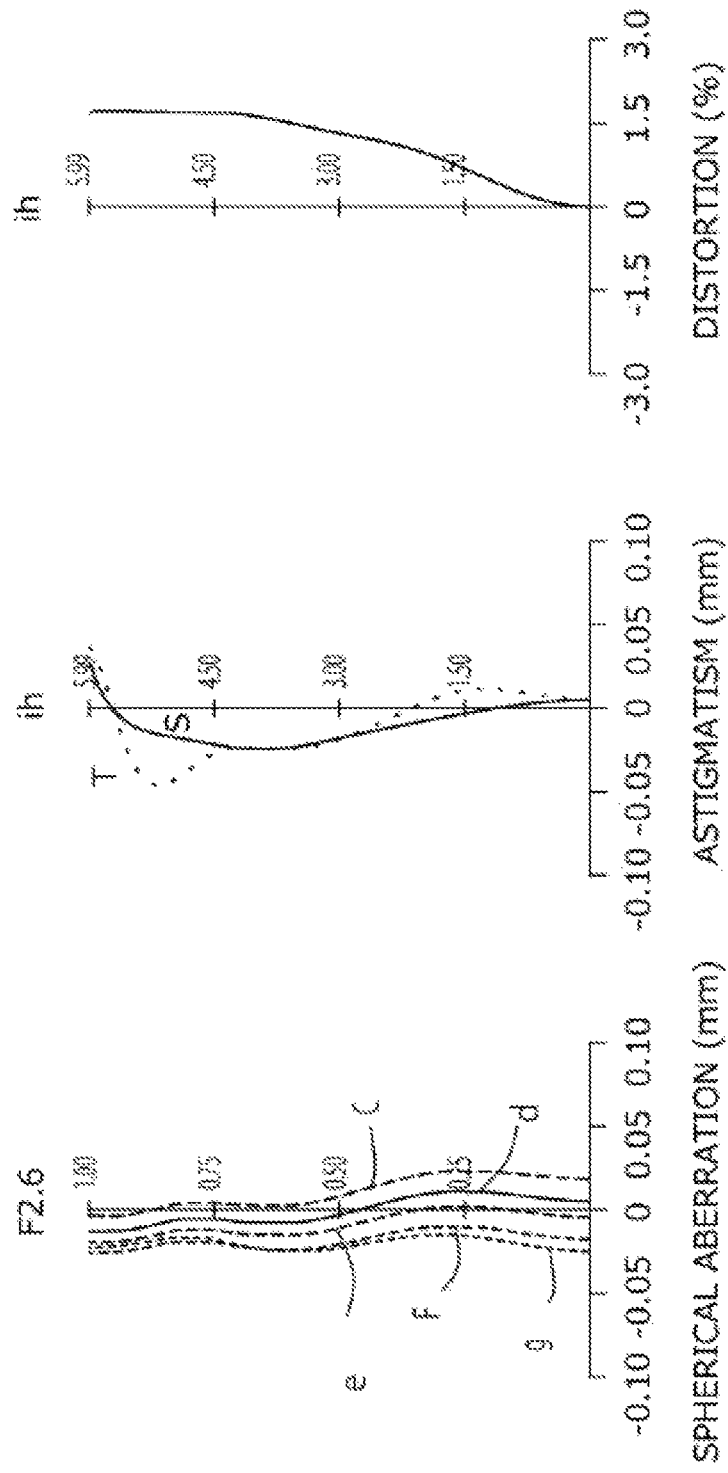
FIG. 14 shows spherical aberration, astigmatism, and distortion of the imaging lens according to Example 5 in which the object is at infinity.
Figure 15:
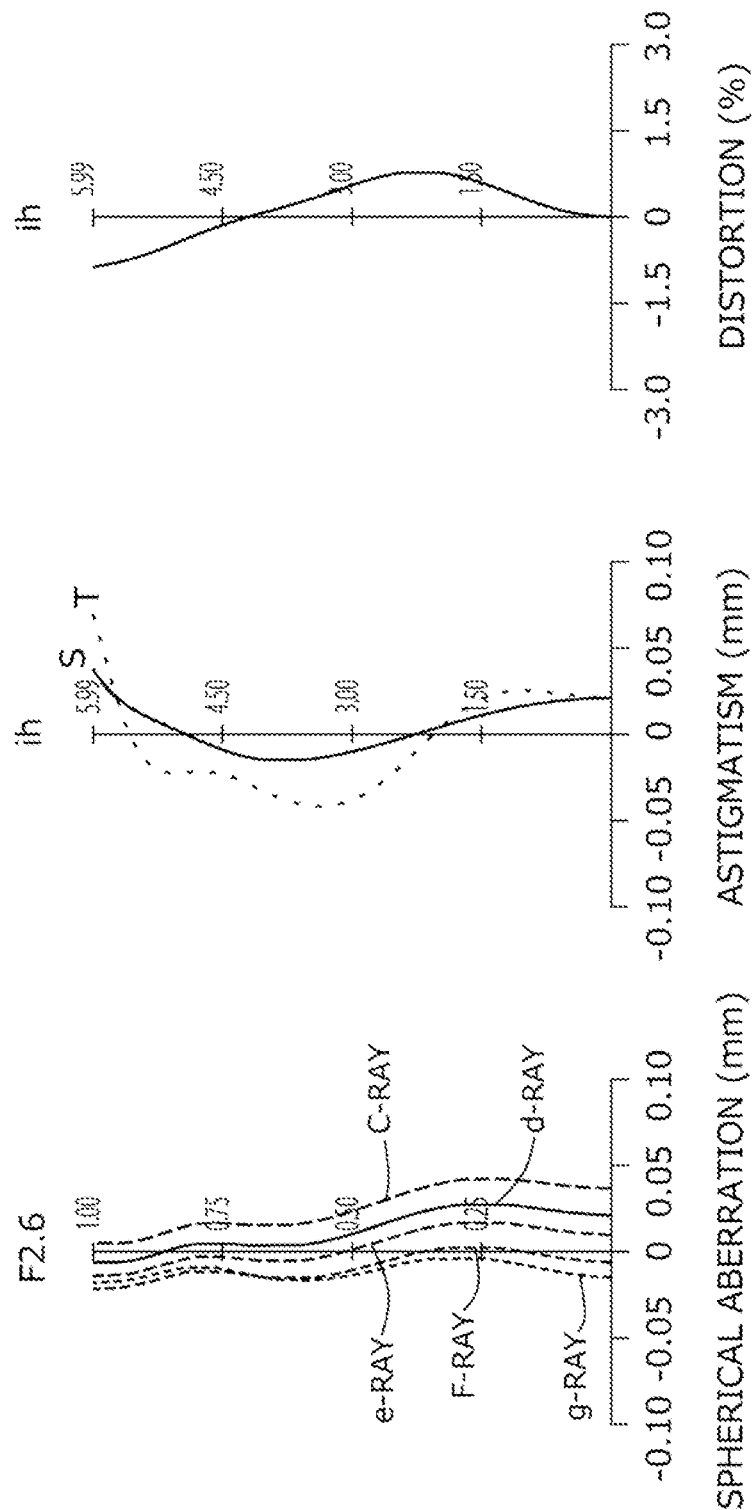
FIG. 15 shows spherical aberration, astigmatism, and distortion of the imaging lens according to Example 5 in which the distance of the object is 150 mm.
Figure 16:
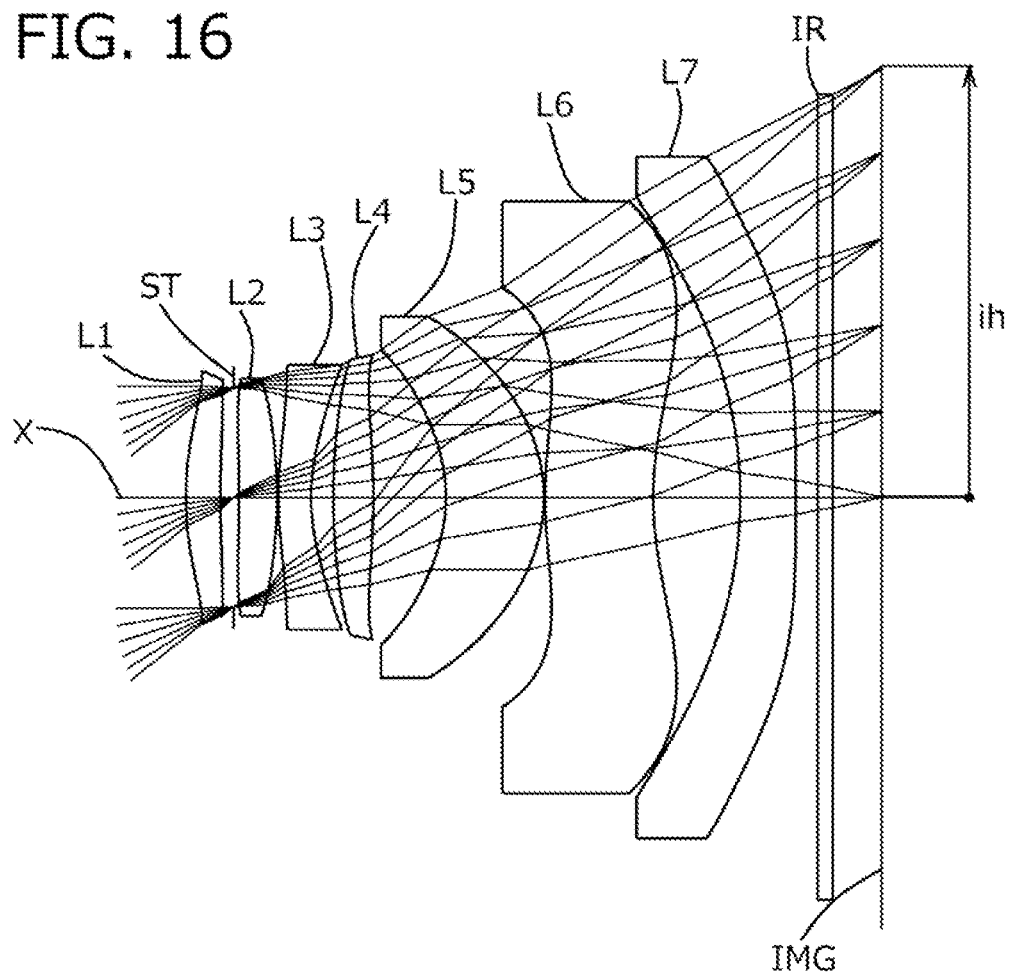
FIG. 16 is a schematic view showing the general configuration of an imaging lens according to Example 6.

FIG. 14 shows various aberrations of the imaging lens according to Example 5 in which the object is at infinity, and FIG. 15 shows various aberrations of the imaging lens according to Example 5 in which the entire imaging lens is extended for autofocusing and the distance of the object is 150 mm. As shown in FIGS. 14 and 15, various aberrations are corrected properly.

The imaging lens provides a wide field of view of nearly 80 degrees and relatively high brightness with an F-value of 2.6. The ratio of total track length TTL to maximum image height ih (TTL/2ih) is 0.80, so it offers a compact design though it uses seven constituent lenses.

Example 6

The basic lens data of Example 6 is shown below in Table 6.

TABLE 6

Example 6
in mm
f = 7.47
Fno = 2.4
ω(°) = 38.3
ih = 5.99
TTL = 9.61

Surface Data

| Surface No. i (Object Surface) | Curvature Radius r Infinity | Surface Distance d Infinity | Refractive Index Nd | Abbe Number vd |
|---|---|---|---|---|
| 1* | 4.228 | 0.485 | 1.5438 | 55.57 |
| 2* | 21.299 | 0.185 | | |
| 3 (Stop) | Infinity | 0.071 | | |
| 4* | −17.571 | 0.527 | 1.5438 | 55.57 |
| 5* | −6.745 | 0.018 | | |
| 6* | 4.767 | 0.453 | 1.6349 | 23.97 |
| 7* | 2.643 | 0.312 | | |
| 8* | 9.287 | 0.552 | 1.5438 | 55.57 |
| 9* | −11.453 | 1.010 | | |
| 10* | −2.332 | 1.363 | 1.5438 | 55.57 |
| 11* | −2.306 | 0.020 | | |
| 12* | 6.453 | 1.500 | 1.5438 | 55.57 |
| 13* | 4.512 | 1.210 | | |
| 14* | −6.0891 | 0.774 | 1.6142 | 25.58 |
| 15* | −95 | 0.300 | | |
| 16 | Infinity | 0.210 | 1.5168 | 64.20 |
| 17 | Infinity | 0.684 | | |
| Image Plane | Infinity | | | |

Constituent Lens Data

| Lens | Start Surface | Focal Length |
|---|---|---|
| 1 | 1 | 9.61 |
| 2 | 4 | 19.79 |
| 3 | 6 | −10.18 |
| 4 | 8 | 9.52 |
| 5 | 10 | 19.52 |
| 6 | 12 | −37.92 |
| 7 | 14 | −10.63 |

| Lens | Composite Focal Length |
|---|---|
| First Lens-Second Lens | 6.74 |
| Fourth Lens-Fifth Lens | 7.82 |
| Sixth Lens-Seventh Lens | −8.64 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −2.970E+01 | −7.426E+00 | 0.000E+00 |
| A4 | −7.587E−03 | −8.307E−03 | 9.881E−03 | 5.442E−03 | −1.009E−02 | −4.272E−03 | −1.655E−03 |
| A6 | −2.348E−03 | 1.567E−03 | 1.348E−03 | −1.394E−03 | −3.885E−04 | 1.278E−03 | 1.102E−03 |
| A8 | −1.446E−04 | 0.000E+00 | 0.000E+00 | −1.481E−03 | −1.770E−05 | 2.871E−04 | 0.000E+00 |
| A10 | 0.000E+00 | 0.000E+00 | 0.000E+00 | 3.659E−04 | 1.067E−04 | −1.215E−04 | 0.000E+00 |

TABLE 6-continued

| | | | | | | | |
|---|---|---|---|---|---|---|---|
| A11 | 0.000E+00 | 0.000E+00 | 0.000E+00 | 0.000E+00 | 0.000E+00 | 2.015E−05 | 0.000E+00 |
| A14 | 0.000E+00 | 0.000E+00 | 0.000E+00 | 0.000E+00 | 0.000E+00 | −7.263E−07 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −8.168E−01 | 0.000E+00 | 0.000E+00 | 0.000E+00 | 0.000E+00 |
| A4 | 4.557E−03 | 1.858E−02 | −2.357E−03 | −1.879E−02 | −1.394E−02 | −4.410E−05 | −5.882E−03 |
| A6 | 1.515E−03 | −1.713E−03 | 5.729E−04 | 8.013E−04 | 5.864E−04 | 4.363E−05 | 2.120E−04 |
| A8 | 0.000E+00 | 3.873E−04 | −1.264E−04 | −8.057E−05 | −2.756E−05 | 0.000E+00 | −1.138E−06 |
| A10 | 0.000E+00 | 0.000E+00 | 0.000E+00 | 0.000E+00 | 2.617E−07 | 0.000E+00 | −2.542E−08 |
| A12 | 0.000E+00 | 0.000E+00 | 0.000E+00 | 0.000E+00 | 0.000E+00 | 0.000E+00 | −5.281E−10 |
| A14 | 0.000E+00 | 0.000E+00 | 0.000E+00 | 0.000E+00 | 0.000E+00 | 0.000E+00 | 2.265E−11 |
| A16 | 0.000E+00 | 0.000E+00 | 0.000E+00 | 0.000E+00 | 0.000E+00 | 0.000E+00 | −1.851E−12 |

As shown in Table 11, the imaging lens according to Example 6 satisfies all the conditional expressions (1) to (8).

Figure 17:
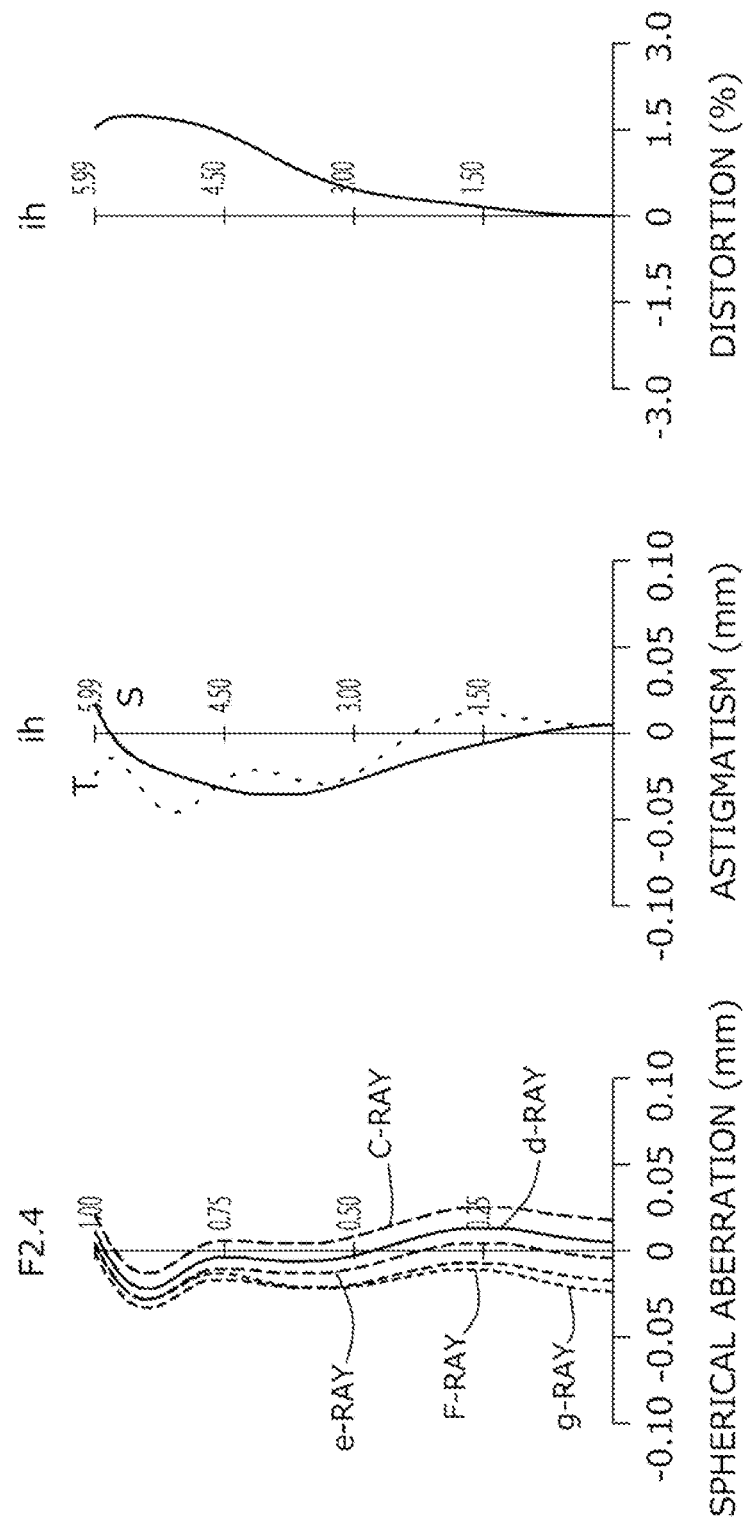
FIG. 17 shows spherical aberration, astigmatism, and distortion of the imaging lens according to Example 6 in which the object is at infinity.
Figure 18:
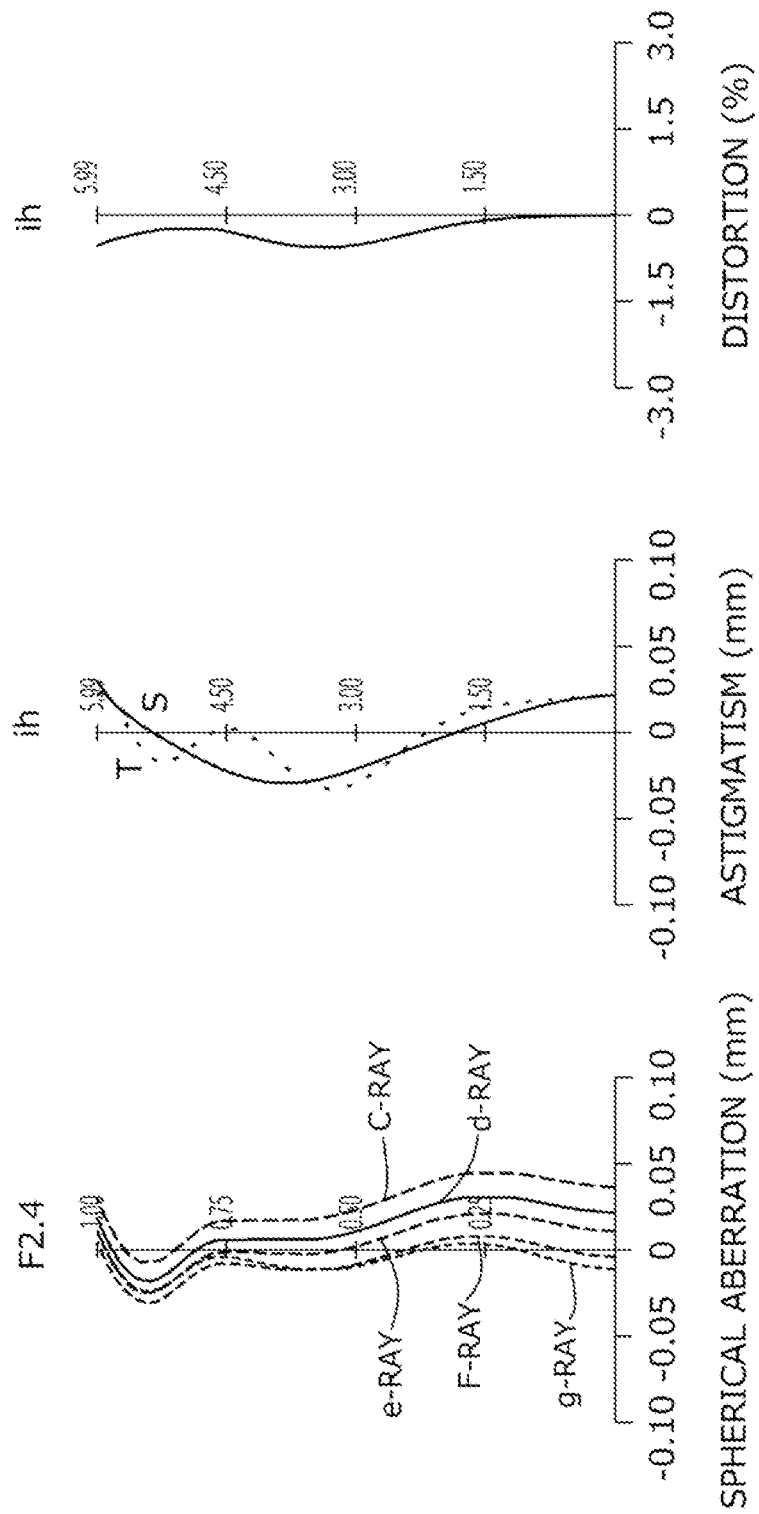
FIG. 18 shows spherical aberration, astigmatism, and distortion of the imaging lens according to Example 6 in which the distance of the object is 150 mm.
Figure 19:
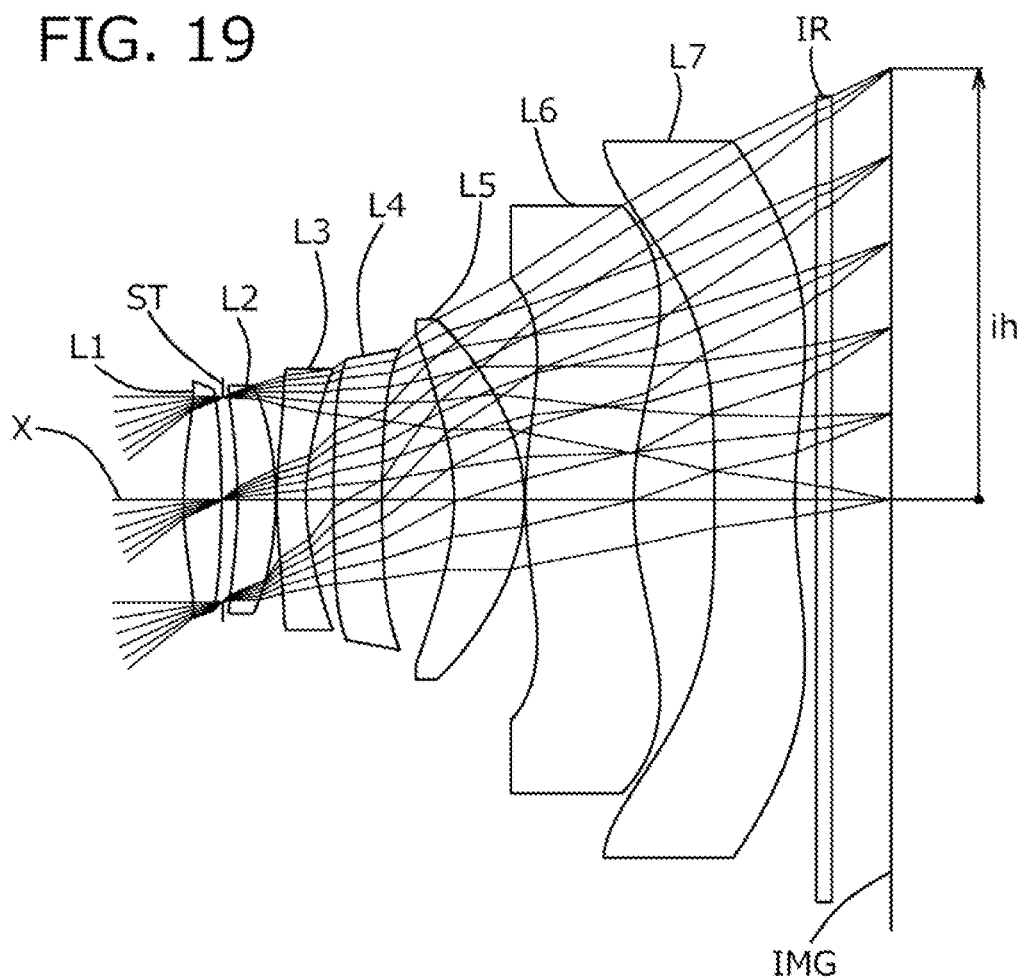
FIG. 19 is a schematic view showing the general configuration of an imaging lens according to Example 7.

FIG. 17 shows various aberrations of the imaging lens according to Example 6 in which the object is at infinity, and FIG. 18 shows various aberrations of the imaging lens according to Example 6 in which the entire imaging lens is extended for autofocusing and the distance of the object is 150 mm. As shown in FIGS. 17 and 18, various aberrations are corrected properly.

The imaging lens provides a wide field of view of nearly 80 degrees and high brightness with an F-value of 2.4. The ratio of total track length TTL to maximum image height ih (TTL/2ih) is 0.80, so it offers a compact design though it uses seven constituent lenses.

Example 7

The basic lens data of Example 7 is shown below in Table 7.

TABLE 7

Example 7
in mm
f = 7.52
Fno = 2.6
ω(°) = 38.1
ih = 5.99
TTL = 9.76

| Surface No. i (Object Surface) | Curvature Radius r Infinity | Surface Distance d Infinity | Refractive Index Nd | Abbe Number vd |
|---|---|---|---|---|
| 1* | 5.305 | 0.526 | 1.5438 | 55.57 |
| 2* | −16.781 | 0.021 | | |
| 3 (Stop) | Infinity | 0.203 | | |
| 4* | −6.885 | 0.527 | 1.5438 | 55.57 |
| 5* | −4.675 | 0.018 | | |
| 6* | 5.866 | 0.409 | 1.6349 | 23.97 |
| 7* | 3.438 | 0.378 | | |
| 8* | 22.701 | 0.675 | 1.6142 | 25.58 |
| 9* | 20.000 | 1.004 | | |
| 10* | −3.416 | 0.973 | 1.5438 | 55.57 |
| 11* | −2.536 | 0.020 | | |
| 12* | 5.741 | 1.503 | 1.5438 | 55.57 |
| 13* | 4.538 | 1.124 | | |
| 14* | −45.2955 | 1.118 | 1.6142 | 25.58 |
| 15* | 7.7347 | 0.300 | | |
| 16 | Infinity | 0.210 | 1.5168 | 64.20 |
| 17 | Infinity | 0.820 | | |
| Image Plane | Infinity | | | |

| Constituent Lens Data | | |
|---|---|---|
| Lens | Start Surface | Focal Length |
| 1 | 1 | 7.48 |
| 2 | 4 | 24.72 |
| 3 | 6 | −14.00 |
| 4 | 8 | −302.47 |
| 5 | 10 | 13.02 |
| 6 | 12 | −71.13 |
| 7 | 14 | −10.67 |

TABLE 7-continued

| Lens | Composite Focal Length |
|---|---|
| First Lens-Second Lens | 6.01 |
| Fourth Lens-Fifth Lens | 13.64 |
| Sixth Lens-Seventh Lens | −9.86 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −3.056E+01 | −7.657E+00 | 0.000E+00 |
| A4 | −9.203E−03 | −6.526E−03 | 9.043E−03 | 9.874E−05 | −8.557E−03 | −3.065E−03 | −1.207E−03 |
| A6 | −2.696E−03 | 1.268E−04 | −1.742E−04 | −1.023E−03 | −1.214E−03 | 1.216E−03 | 2.024E−03 |
| A8 | −2.373E−04 | 0.000E+00 | 0.000E+00 | −1.017E−03 | −2.494E−05 | 1.572E−05 | 0.000E+00 |
| A10 | 0.000E+00 | 0.000E+00 | 0.000E+00 | 2.804E−04 | 1.964E−04 | −1.073E−04 | 0.000E+00 |
| A12 | 0.000E+00 | 0.000E+00 | 0.000E+00 | 0.000E+00 | 0.000E+00 | 5.115E−05 | 0.000E+00 |
| A14 | 0.000E+00 | 0.000E+00 | 0.000E+00 | 0.000E+00 | 0.000E+00 | −3.527E−06 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −1.075E+00 | 0.000E+00 | 0.000E+00 | 0.000E+00 | 0.000E+00 |
| A4 | 3.404E−03 | 1.715E−02 | 4.304E−04 | −1.416E−02 | −1.210E−02 | −6.414E−03 | −8.982E−03 |
| A6 | 8.983E−04 | −8.771E−04 | 4.437E−04 | 5.651E−04 | 3.585E−04 | 1.754E−04 | 2.930E−04 |
| A8 | 0.000E+00 | 6.933E−06 | −7.997E−05 | −3.859E−05 | −1.313E−05 | 0.000E+00 | −3.262E−06 |
| A10 | 0.000E+00 | 0.000E+00 | 0.000E+00 | 0.000E+00 | −6.078E−08 | 0.000E+00 | −1.744E−07 |
| A12 | 0.000E+00 | 0.000E+00 | 0.000E+00 | 0.000E+00 | 0.000E+00 | 0.000E+00 | 5.456E−09 |
| A14 | 0.000E+00 | 0.000E+00 | 0.000E+00 | 0.000E+00 | 0.000E+00 | 0.000E+00 | 1.177E−10 |
| A16 | 0.000E+00 | 0.000E+00 | 0.000E+00 | 0.000E+00 | 0.000E+00 | 0.000E+00 | −4.877E−12 |

As shown in Table 11, the imaging lens according to Example 7 satisfies all the conditional expressions (1) to (8).

Figure 20:
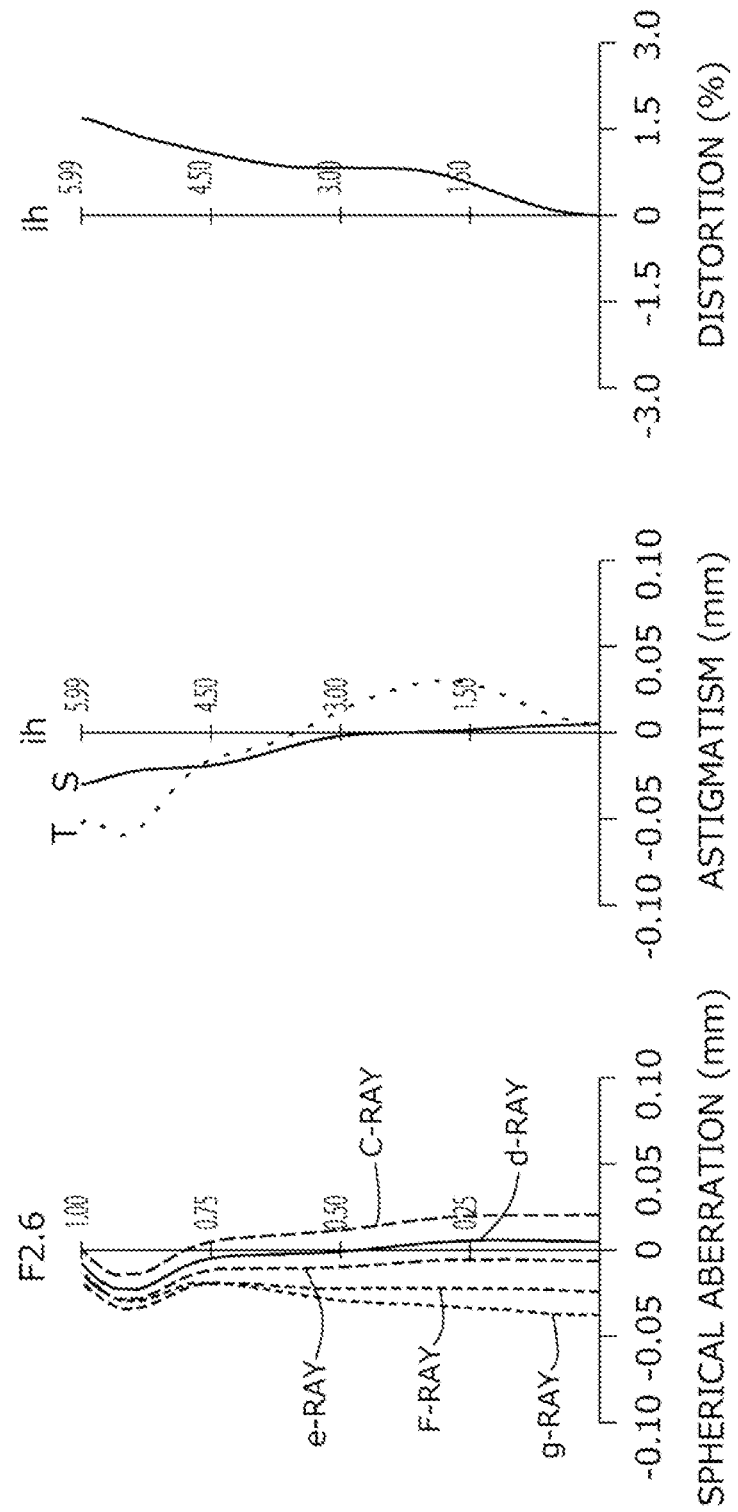
FIG. 20 shows spherical aberration, astigmatism, and distortion of the imaging lens according to Example 7 in which the object is at infinity.
Figure 21:
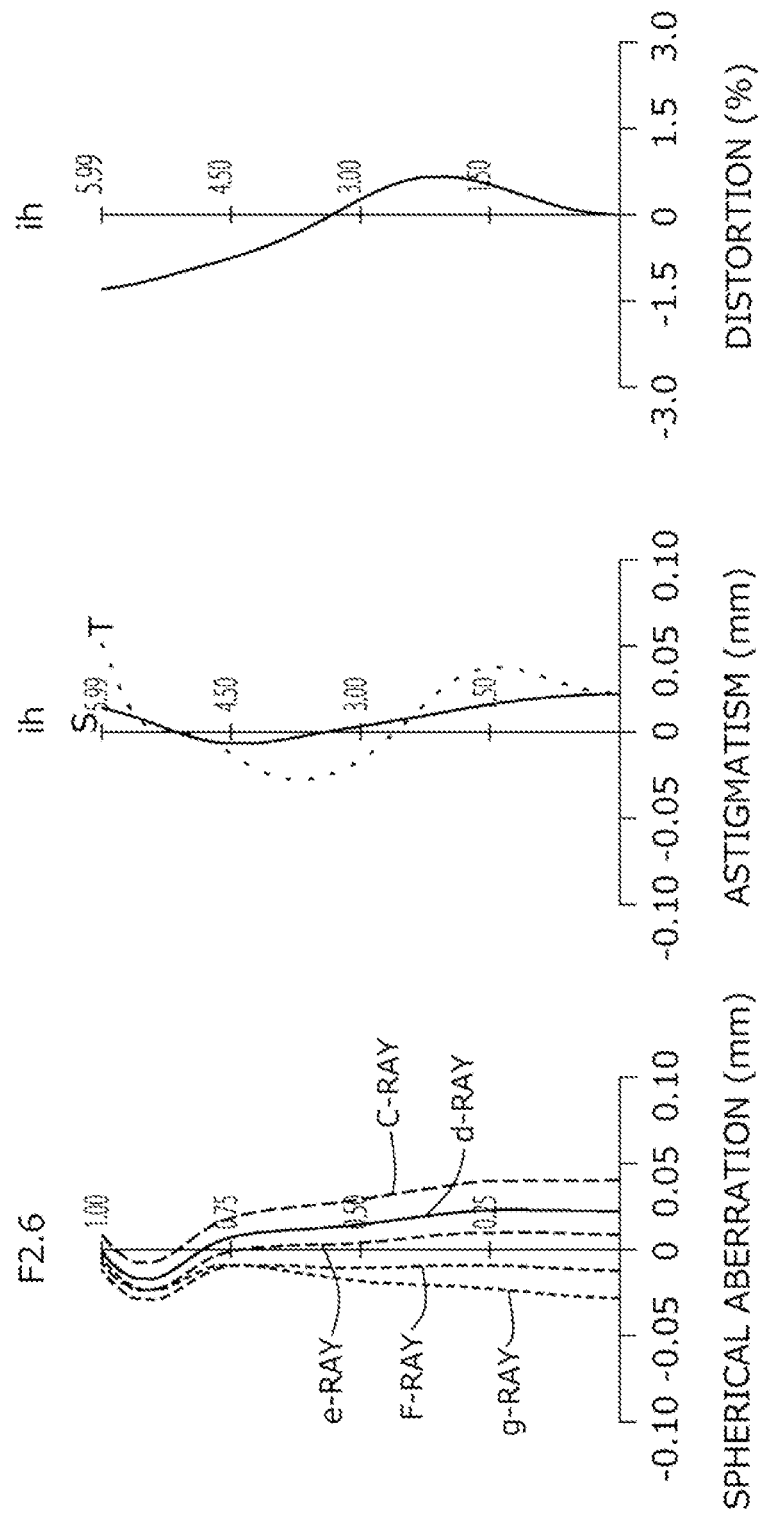
FIG. 21 shows spherical aberration, astigmatism, and distortion of the imaging lens according to Example 7 in which the distance of the object is 150 mm.
Figure 22:
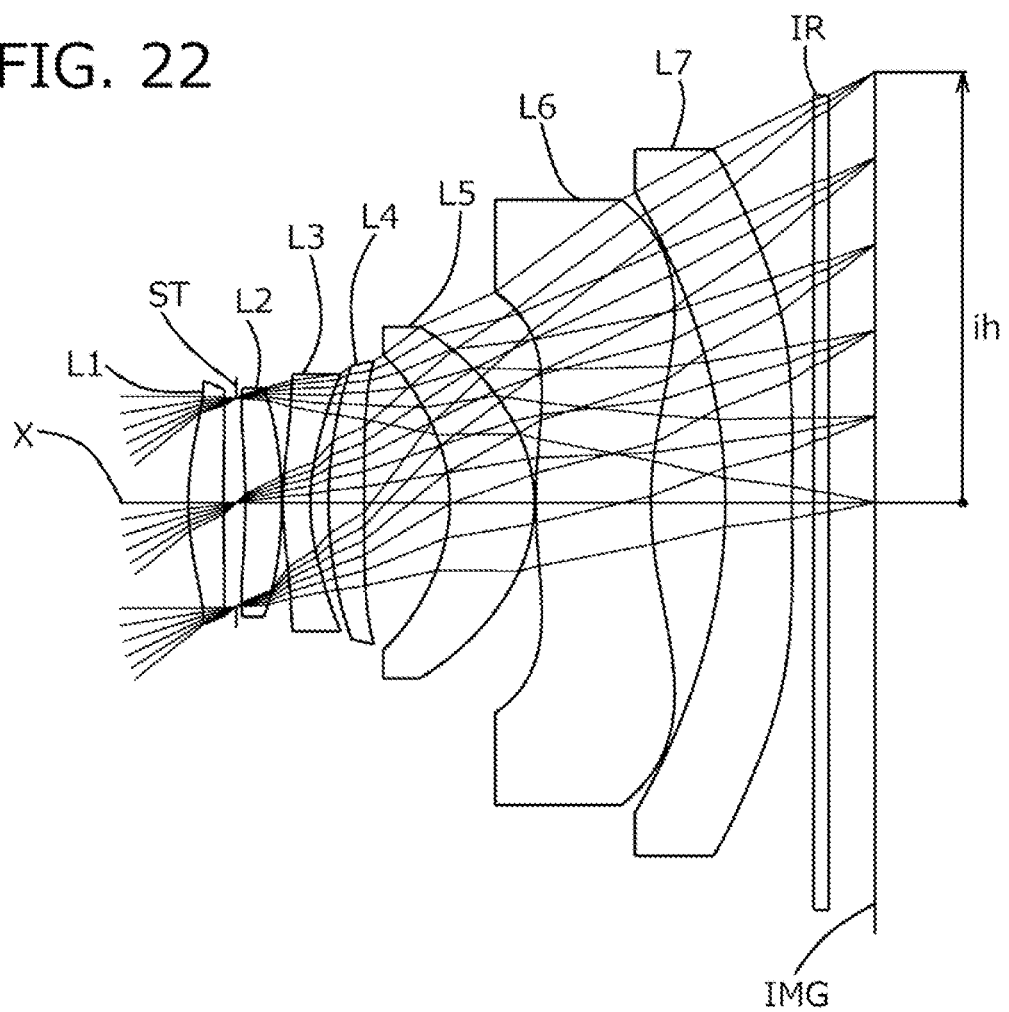
FIG. 22 is a schematic view showing the general configuration of an imaging lens according to Example 8.

FIG. 20 shows various aberrations of the imaging lens according to Example 7 in which the object is at infinity, and FIG. 21 shows various aberrations of the imaging lens according to Example 7 in which the entire imaging lens is extended for autofocusing and the distance of the object is 150 mm. As shown in FIGS. 20 and 21, various aberrations are corrected properly.

The imaging lens provides a wide field of view of nearly 80 degrees and relatively high brightness with an F-value of 2.6. The ratio of total track length TTL to maximum image height ih (TTL/2ih) is 0.81, so it offers a compact design though it uses seven constituent lenses.

Example 8

The basic lens data of Example 8 is shown below in Table 8.

TABLE 8

Example 8
in mm
f = 7.35
Fno = 2.5
ω(°) = 38.1
ih = 5.99
TTL = 9.46

Surface Data

| Surface No. i (Object Surface) | Curvature Radius r Infinity | Surface Distance d Infinity | Refractive Index Nd | Abbe Number vd |
|---|---|---|---|---|
| 1* | 4.126 | 0.488 | 1.5438 | 55.57 |
| 2* | 27.823 | 0.176 | | |
| 3 (Stop) | Infinity | 0.128 | | |
| 4* | −9.107 | 0.504 | 1.5438 | 55.57 |
| 5* | −5.481 | 0.018 | | |
| 6* | 4.477 | 0.377 | 1.6349 | 23.97 |
| 7* | 2.596 | 0.255 | | |
| 8* | 5.706 | 0.494 | 1.5438 | 55.57 |
| 9* | 95.000 | 1.192 | | |
| 10* | −2.340 | 1.176 | 1.5438 | 55.57 |
| 11* | −2.194 | 0.018 | | |
| 12* | 6.759 | 1.600 | 1.5438 | 55.57 |
| 13* | 4.7209 | 1.036 | | |
| 14* | −7.3276 | 0.926 | 1.6142 | 25.58 |
| 15* | 69.3383 | 0.300 | | |
| 16 | Infinity | 0.210 | 1.5168 | 64.20 |
| 17 | Infinity | 0.639 | | |
| Image Plane | Infinity | | | |

TABLE 8-continued

Constituent Lens Data

| Lens | Start Surface | Focal Length |
|---|---|---|
| 1 | 1 | 8.84 |
| 2 | 4 | 24.13 |
| 3 | 6 | −10.55 |
| 4 | 8 | 11.14 |
| 5 | 10 | 16.87 |
| 6 | 12 | −39.80 |
| 7 | 14 | −10.74 |

| Lens | Composite Focal Length |
|---|---|
| First Lens-Second Lens | 6.77 |
| Fourth Lens-Fifth Lens | 8.07 |
| Sixth Lens-Seventh Lens | −8.85 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −2.632E+01 | −7.472E+00 | 0.000E+00 |
| A4 | −8.517E−03 | −9.012E−03 | 1.127E−02 | 4.298E−03 | −1.117E−02 | −3.998E−03 | −3.260E−03 |
| A6 | −2.536E−03 | 1.390E−03 | 1.686E−03 | −1.531E−03 | −6.914E−04 | 1.248E−03 | 7.717E−04 |
| A8 | −3.671E−04 | 0.000E+00 | 0.000E+00 | −1.432E−03 | −3.742E−05 | 3.045E−04 | 0.000E+00 |
| A10 | 0.000E+00 | 0.000E+00 | 0.000E+00 | 3.826E−04 | 1.584E−04 | −1.142E−04 | 0.000E+00 |
| A12 | 0.000E+00 | 0.000E+00 | 0.000E+00 | 0.000E+00 | 0.000E+00 | 2.381E−05 | 0.000E+00 |
| A14 | 0.000E+00 | 0.000E+00 | 0.000E+00 | 0.000E+00 | 0.000E+00 | −7.263E−07 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −7.896E−01 | 0.000E+00 | 0.000E+00 | 0.000E+00 | 0.000E+00 |
| A4 | 5.630E−03 | 1.646E−02 | −2.760E−03 | −1.839E−02 | −1.264E−02 | 4.685E−04 | −5.386E−03 |
| A6 | 5.377E−04 | −2.033E−03 | 4.905E−04 | 9.492E−04 | 5.286E−04 | −1.829E−06 | 1.687E−04 |
| A8 | 0.000E+00 | 4.884E−04 | −1.012E−04 | −8.811E−05 | −2.519E−05 | 0.000E+00 | −2.906E−07 |
| A10 | 0.000E+00 | 0.000E+00 | 0.000E+00 | 0.000E+00 | 2.486E−07 | 0.000E+00 | −9.285E−09 |
| A12 | 0.000E+00 | 0.000E+00 | 0.000E+00 | 0.000E+00 | 0.000E+00 | 0.000E+00 | −1.847E−09 |
| A14 | 0.000E+00 | 0.000E+00 | 0.000E+00 | 0.000E+00 | 0.000E+00 | 0.000E+00 | 1.260E−12 |
| A16 | 0.000E+00 | 0.000E+00 | 0.000E+00 | 0.000E+00 | 0.000E+00 | 0.000E+00 | 2.940E−13 |

As shown in Table 11, the imaging lens according to Example 8 satisfies all the conditional expressions (1) to (8).

Figure 23:
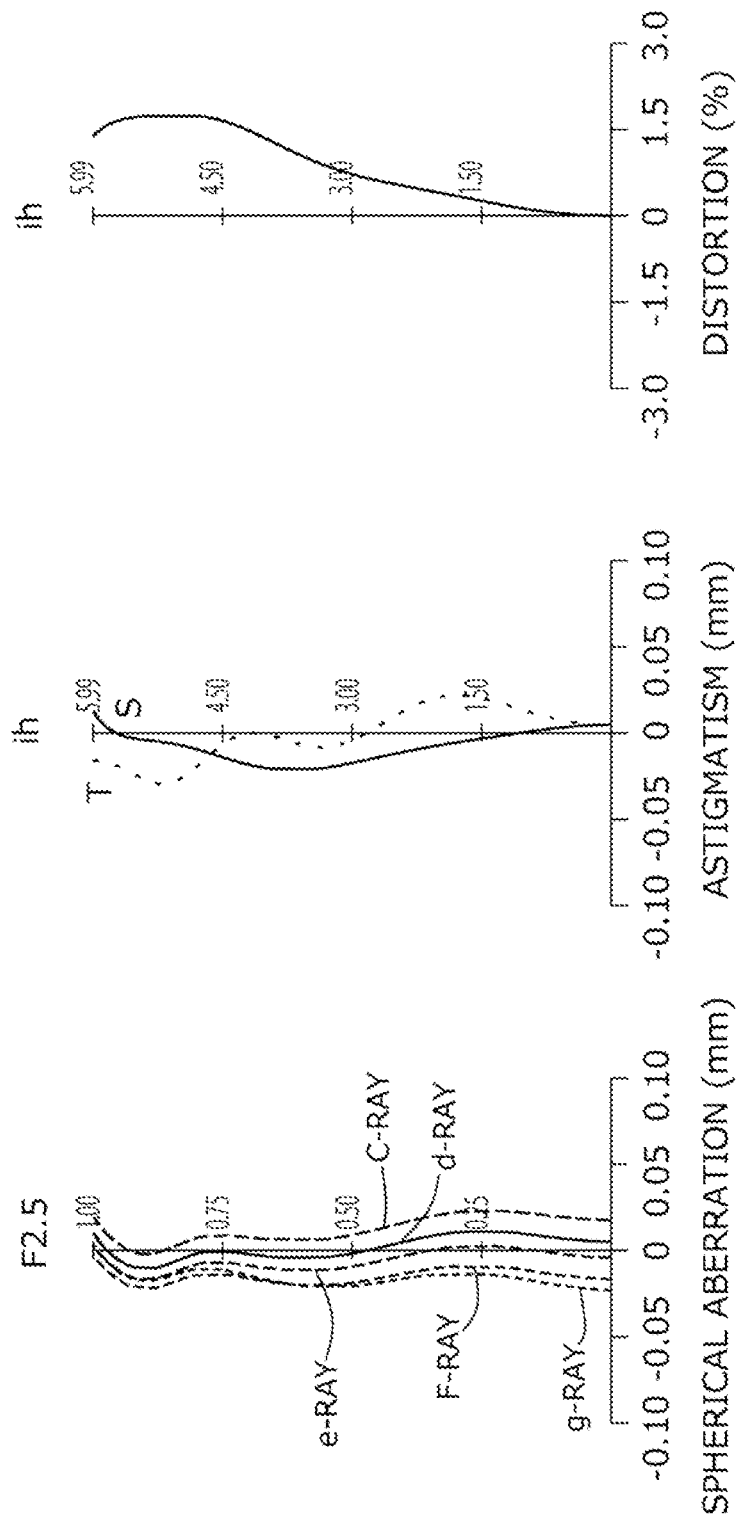
FIG. 23 shows spherical aberration, astigmatism, and distortion of the imaging lens according to Example 8 in which the object is at infinity.
Figure 24:
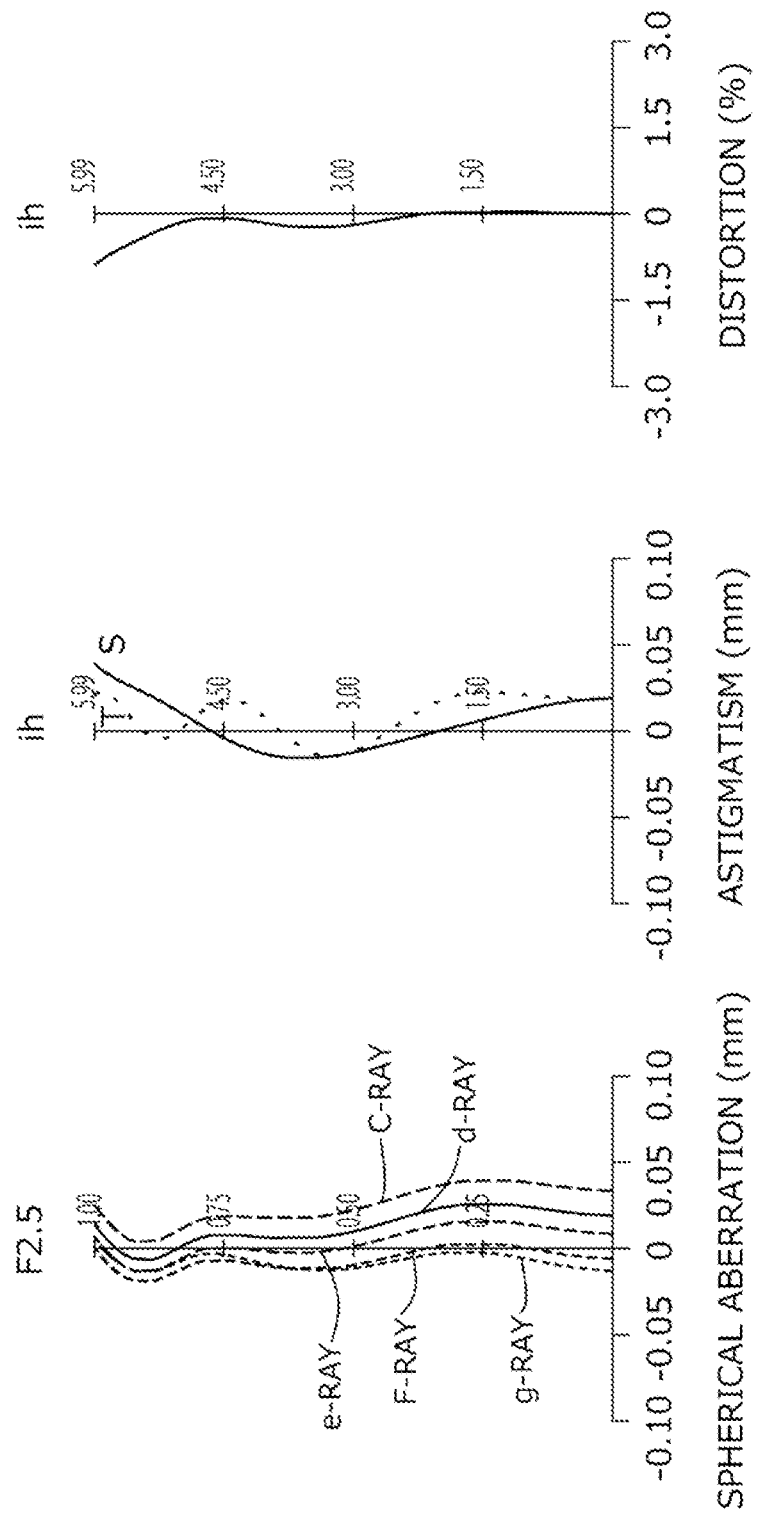
FIG. 24 shows spherical aberration, astigmatism, and distortion of the imaging lens according to Example 8 in which the distance of the object is 150 mm.
Figure 25:
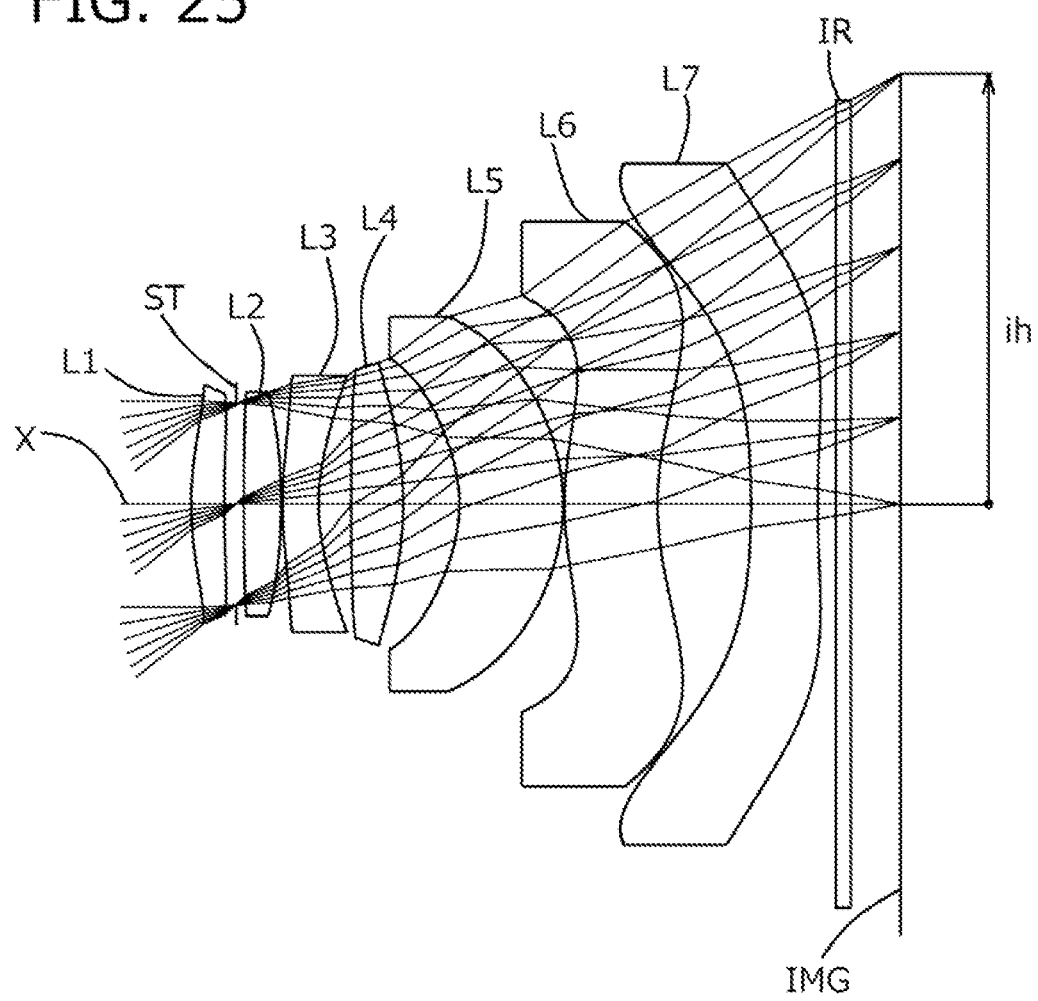
FIG. 25 is a schematic view showing the general configuration of an imaging lens according to Example 9.

FIG. 23 shows various aberrations of the imaging lens according to Example 8 in which the object is at infinity, and FIG. 24 shows various aberrations of the imaging lens according to Example 8 in which the entire imaging lens is extended for autofocusing and the distance of the object is 150 mm. As shown in FIGS. 23 and 24, various aberrations are corrected properly.

The imaging lens provides a wide field of view of nearly 80 degrees and high brightness with an F-value of 2.5. The ratio of total track length TTL to maximum image height ih (TTL/2ih) is 0.79, so it offers a compact design though it uses seven constituent lenses.

Example 9

The basic lens data of Example 9 is shown below in Table 9.

TABLE 9

Example 9
in mm
f = 7.47
Fno = 2.6
ω(°) = 38.23
ih = 5.99
TTL = 9.79

Surface Data

| Surface No. i (Object Surface) | Curvature Radius r Infinity | Surface Distance d Infinity | Refractive Index Nd | Abbe Number νd |
|---|---|---|---|---|
| 1* | 4.789 | 0.460 | 1.5438 | 55.57 |
| 2* | 16.752 | 0.160 | | |
| 3 (Stop) | Infinity | 0.110 | | |
| 4* | 95.000 | 0.520 | 1.5438 | 55.57 |
| 5* | −7.479 | 0.018 | | |
| 6* | 5.133 | 0.500 | 1.6349 | 23.97 |
| 7* | 2.770 | 0.451 | | |

TABLE 9-continued

| | | | | |
|---|---|---|---|---|
| 8* | 26.898 | 0.725 | 1.5438 | 55.57 |
| 9* | −5.144 | 0.783 | | |
| 10* | −2.200 | 1.444 | 1.5438 | 55.57 |
| 11* | −2.832 | 0.020 | | |
| 12* | 4.504 | 1.293 | 1.5438 | 55.57 |
| 13* | 4.2233 | 1.299 | | |
| 14* | −11.9795 | 0.927 | 1.6142 | 25.58 |
| 15* | 13.4543 | 0.250 | | |
| 16 | Infinity | 0.210 | 1.5168 | 64.20 |
| 17 | Infinity | 0.687 | | |
| Image Plane | Infinity | | | |

Constituent Lens Data

| Lens | Start Surface | Focal Length |
|---|---|---|
| 1 | 1 | 12.17 |
| 2 | 4 | 12.77 |
| 3 | 6 | −10.33 |
| 4 | 8 | 8.00 |
| 5 | 10 | −92.74 |
| 6 | 12 | 199.91 |
| 7 | 14 | −10.18 |

| Lens | Composite Focal Length |
|---|---|
| First Lens-Second Lens | 6.49 |
| Fourth Lens-Fifth Lens | 10.77 |
| Sixth Lens-Seventh Lens | −12.11 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −2.783E+01 | −7.256E+00 | 0.000E+00 |
| A4 | −8.273E−03 | −9.963E−03 | 5.816E−03 | 3.443E−03 | −1.061E−02 | −3.471E−03 | −5.906E−03 |
| A6 | −2.605E−03 | −2.187E−04 | −8.235E−04 | −2.066E−03 | −2.861E−04 | 8.096E−04 | 1.742E−03 |
| A8 | 0.000E+00 | 0.000E+00 | 0.000E+00 | −1.004E−03 | −8.302E−05 | 2.716E−04 | 0.000E+00 |
| A10 | 0.000E+00 | 0.000E+00 | 0.000E+00 | 3.321E−04 | 1.942E−04 | −1.350E−04 | 0.000E+00 |
| A12 | 0.000E+00 | 0.000E+00 | 0.000E+00 | 0.000E+00 | 0.000E+00 | 2.580E−05 | 0.000E+00 |
| A14 | 0.000E+00 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −9.979E−01 | 0.000E+00 | 0.000E+00 | 0.000E+00 | 0.000E+00 |
| A4 | −9.927E−04 | 2.847E−02 | −1.491E−03 | −2.009E−02 | −1.310E−02 | −8.896E−03 | −9.550E−03 |
| A6 | 1.172E−03 | −1.587E−03 | 3.939E−04 | 8.868E−04 | 2.096E−04 | 3.261E−04 | 2.211E−04 |
| A8 | 0.000E+00 | 0.000E+00 | −2.078E−04 | −1.527E−04 | −1.462E−05 | 0.000E+00 | 4.801E−06 |
| A10 | 0.000E+00 | 0.000E+00 | 0.000E+00 | 0.000E+00 | 0.000E+00 | 0.000E+00 | −1.574E−07 |
| A12 | 0.000E+00 | 0.000E+00 | 0.000E+00 | 0.000E+00 | 0.000E+00 | 0.000E+00 | −2.691E−09 |
| A14 | 0.000E+00 | 0.000E+00 | 0.000E+00 | 0.000E+00 | 0.000E+00 | 0.000E+00 | 9.923E−11 |
| A16 | 0.000E+00 | 0.000E+00 | 0.000E+00 | 0.000E+00 | 0.000E+00 | 0.000E+00 | −1.248E−12 |

As shown in Table 11, the imaging lens according to Example 9 satisfies all the conditional expressions (1) to (8).

Figure 26:
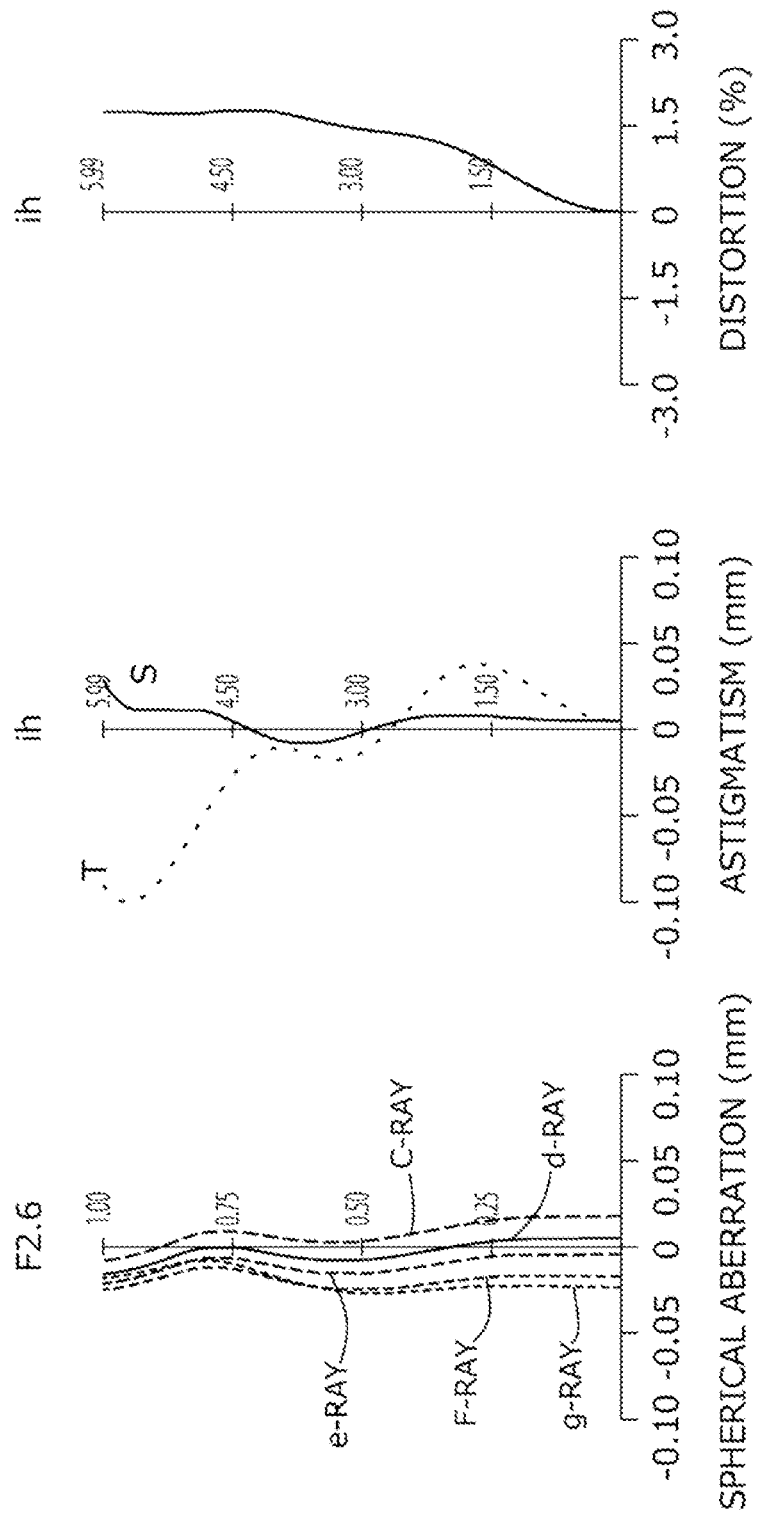
FIG. 26 shows spherical aberration, astigmatism, and distortion of the imaging lens according to Example 9 in which the object is at infinity.
Figure 27:
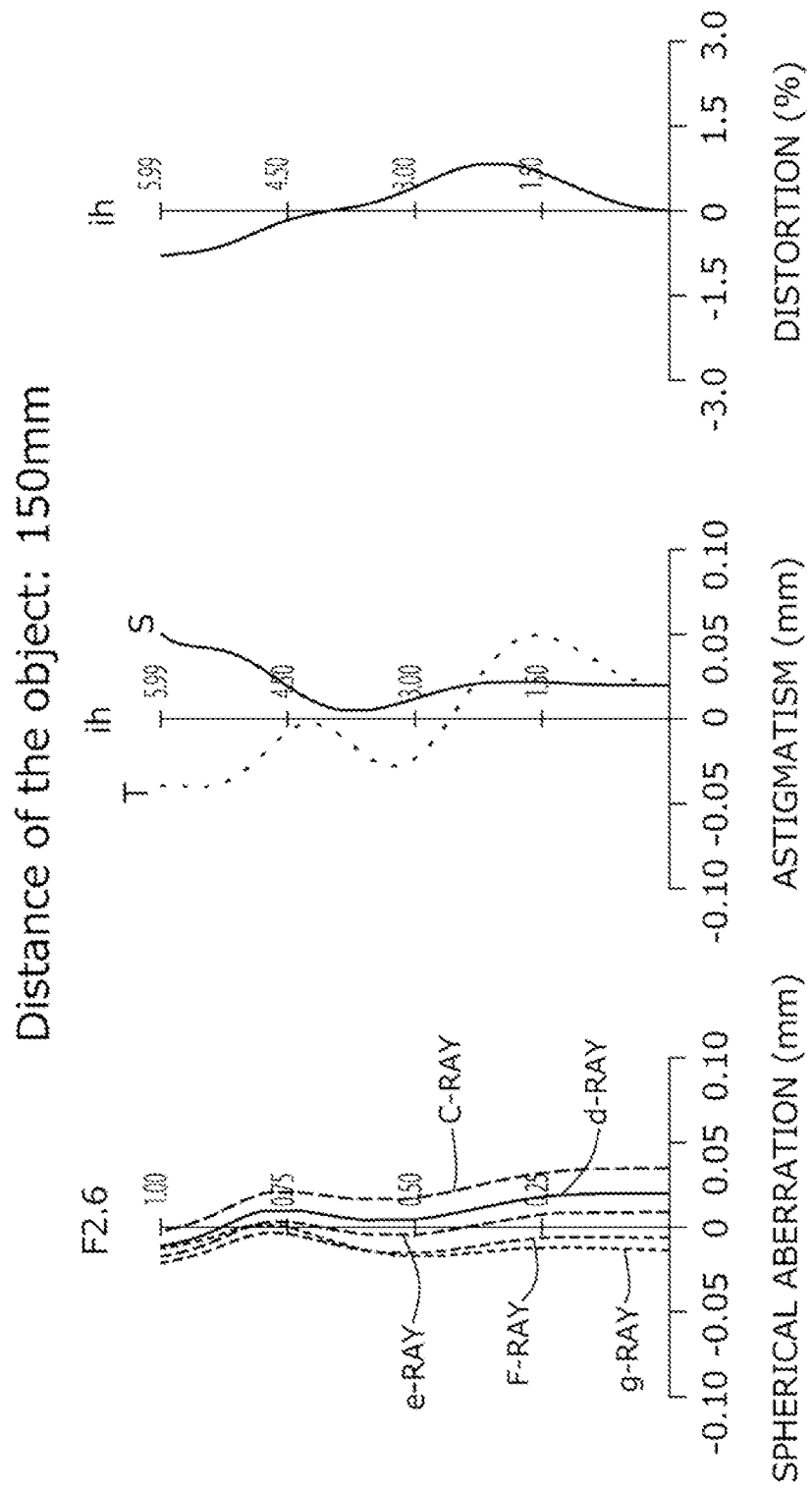
FIG. 27 shows spherical aberration, astigmatism, and distortion of the imaging lens according to Example 9 in which the distance of the object is 150 mm.
Figure 28:
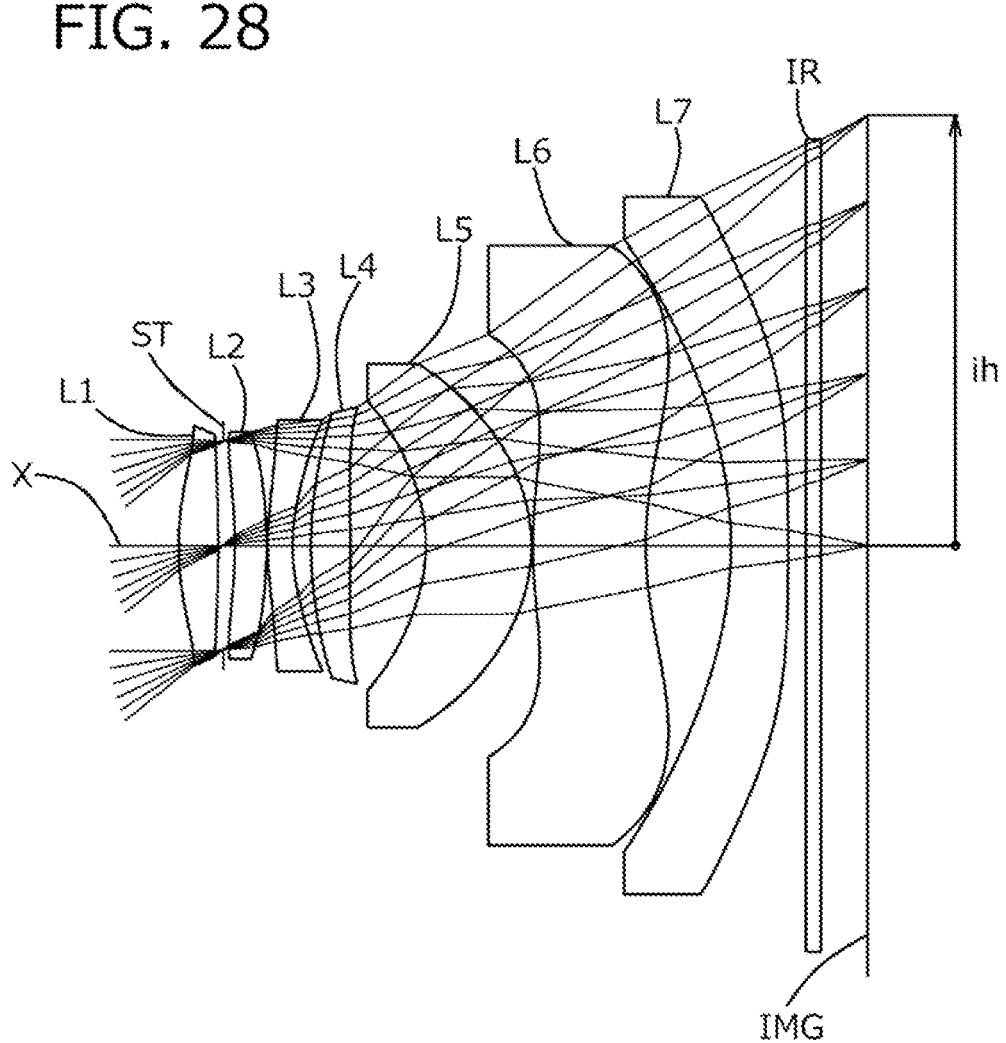
FIG. 28 is a schematic view showing the general configuration of an imaging lens according to Example 10.

FIG. 26 shows various aberrations of the imaging lens according to Example 9 in which the object is at infinity, and FIG. 27 shows various aberrations of the imaging lens according to Example 9 in which the entire imaging lens is extended for autofocusing and the distance of the object is 150 mm. As shown in FIGS. 26 and 27, various aberrations are corrected properly.

The imaging lens provides a wide field of view of nearly 80 degrees and relatively high brightness with an F-value of 2.6. The ratio of total track length TTL to maximum image height ih (TTL/2ih) is 0.82, so it offers a compact design though it uses seven constituent lenses.

Example 10

The basic lens data of Example 10 is shown below in Table 10.

TABLE 10

Example 10
in mm
f = 7.36
Fno = 2.5
ω(°) = 38.7
ih = 5.99
TTL = 9.50

Surface Data

| Surface No. i (Object Surface) | Curvature Radius r Infinity | Surface Distance d Infinity | Refractive Index Nd | Abbe Number vd |
|---|---|---|---|---|
| 1* | 4.082 | 0.546 | 1.5438 | 55.57 |
| 2* | −40.974 | 0.075 | | |
| 3 (Stop) | Infinity | 0.160 | | |
| 4* | −6.249 | 0.441 | 1.5438 | 55.57 |
| 5* | −6.657 | 0.018 | | |
| 6* | 4.596 | 0.343 | 1.6349 | 23.97 |
| 7* | 2.641 | 0.257 | | |
| 8* | 5.491 | 0.548 | 1.5438 | 55.57 |
| 9* | −39.207 | 1.047 | | |
| 10* | −2.412 | 1.469 | 1.5438 | 55.57 |
| 11* | −2.404 | 0.020 | | |
| 12* | 6.345 | 1.568 | 1.5438 | 55.57 |
| 13* | 4.741 | 1.186 | | |
| 14* | −5.6141 | 0.794 | 1.6142 | 25.58 |
| 15* | −65.3607 | 0.250 | | |
| 16 | Infinity | 0.210 | 1.5168 | 64.20 |
| 17 | Infinity | 0.638 | | |
| Image Plane | Infinity | | | |

Constituent Lens Data

| Lens | Start Surface | Focal Length |
|---|---|---|
| 1 | 1 | 6.86 |
| 2 | 4 | −302.62 |
| 3 | 6 | −10.49 |
| 4 | 8 | 8.90 |
| 5 | 10 | 20.28 |
| 6 | 12 | −52.62 |
| 7 | 14 | −10.05 |

| Lens | Composite Focal Length |
|---|---|
| First Lens-Second Lens | 7.17 |
| Fourth Lens-Fifth Lens | 7.69 |
| Sixth Lens-Seventh Lens | −8.93 |

Aspheric Surface Data

| | 1st Surface | 2nd Surface | 4th Surface | 5th Surface | 6th Surface | 7th Surface | 8th Surface |
|---|---|---|---|---|---|---|---|
| k | 0.000E+00 | 0.000E+00 | 0.000E+00 | 0.000E+00 | −2.719E+01 | −7.225E+00 | 0.000E+00 |
| A4 | −7.900E−03 | −7.942E−03 | 1.650E−02 | 2.599E−03 | −1.253E−02 | −4.166E−03 | −5.588E−03 |
| A6 | −3.056E−03 | 2.148E−03 | 1.728E−03 | −1.640E−03 | −2.547E−04 | 1.597E−03 | 9.647E−04 |
| A8 | −3.141E−04 | 0.000E+00 | 0.000E+00 | −1.566E−03 | 3.480E−04 | 4.406E−04 | 0.000E+00 |
| A10 | 0.000E+00 | 0.000E+00 | 0.000E+00 | 4.313E−04 | 8.883E−05 | −1.358E−04 | 0.000E+00 |
| A12 | 0.000E+00 | 0.000E+00 | 0.000E+00 | 0.000E+00 | 0.000E+00 | 2.231E−05 | 0.000E+00 |
| A14 | 0.000E+00 | 0.000E+00 | 0.000E+00 | 0.000E+00 | 0.000E+00 | −7.263E−07 | 0.000E+00 |
| A16 | 0.000E+00 | 0.000E+00 | 0.000E+00 | 0.000E+00 | 0.000E+00 | 0.000E+00 | 0.000E+00 |

| | 9th Surface | 10th Surface | 11th Surface | 12th Surface | 13th Surface | 14th Surface | 15th Surface |
|---|---|---|---|---|---|---|---|
| k | 0.000E+00 | 0.000E+00 | −7.921E−01 | 0.000E+00 | 0.000E+00 | 0.000E+00 | 0.000E+00 |
| A4 | 7.101E−03 | 1.848E−02 | −2.652E−03 | −1.829E−02 | −1.209E−02 | 1.274E−03 | −4.969E−03 |
| A6 | 8.746E−04 | −1.959E−03 | 5.219E−04 | 6.593E−04 | 4.187E−04 | 9.132E−06 | 1.683E−04 |
| A8 | 0.000E+00 | 3.805E−04 | −1.145E−04 | −7.584E−05 | −1.751E−05 | 0.000E+00 | −4.212E−07 |
| A10 | 0.000E+00 | 0.000E+00 | 0.000E+00 | 0.000E+00 | 6.682E−08 | 0.000E+00 | −1.586E−08 |
| A12 | 0.000E+00 | 0.000E+00 | 0.000E+00 | 0.000E+00 | 0.000E+00 | 0.000E+00 | −1.086E−09 |
| A14 | 0.000E+00 | 0.000E+00 | 0.000E+00 | 0.000E+00 | 0.000E+00 | 0.000E+00 | −1.717E−11 |
| A16 | 0.000E+00 | 0.000E+00 | 0.000E+00 | 0.000E+00 | 0.000E+00 | 0.000E+00 | 2.057E−13 |

As shown in Table 11, the imaging lens according to Example 10 satisfies all the conditional expressions (1) to (8).

Figure 29:
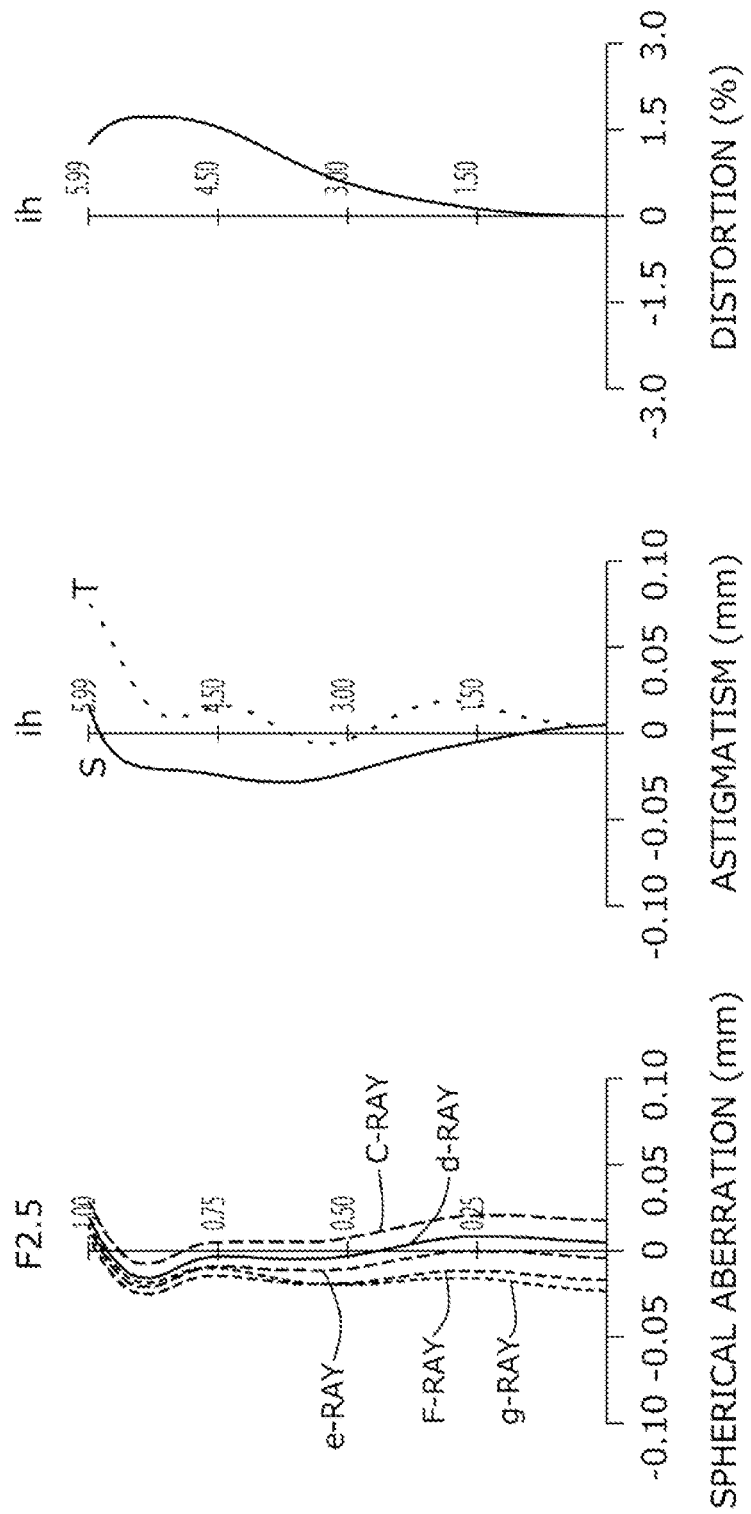
FIG. 29 shows spherical aberration, astigmatism, and distortion of the imaging lens according to Example 10 in which the object is at infinity.
Figure 30:
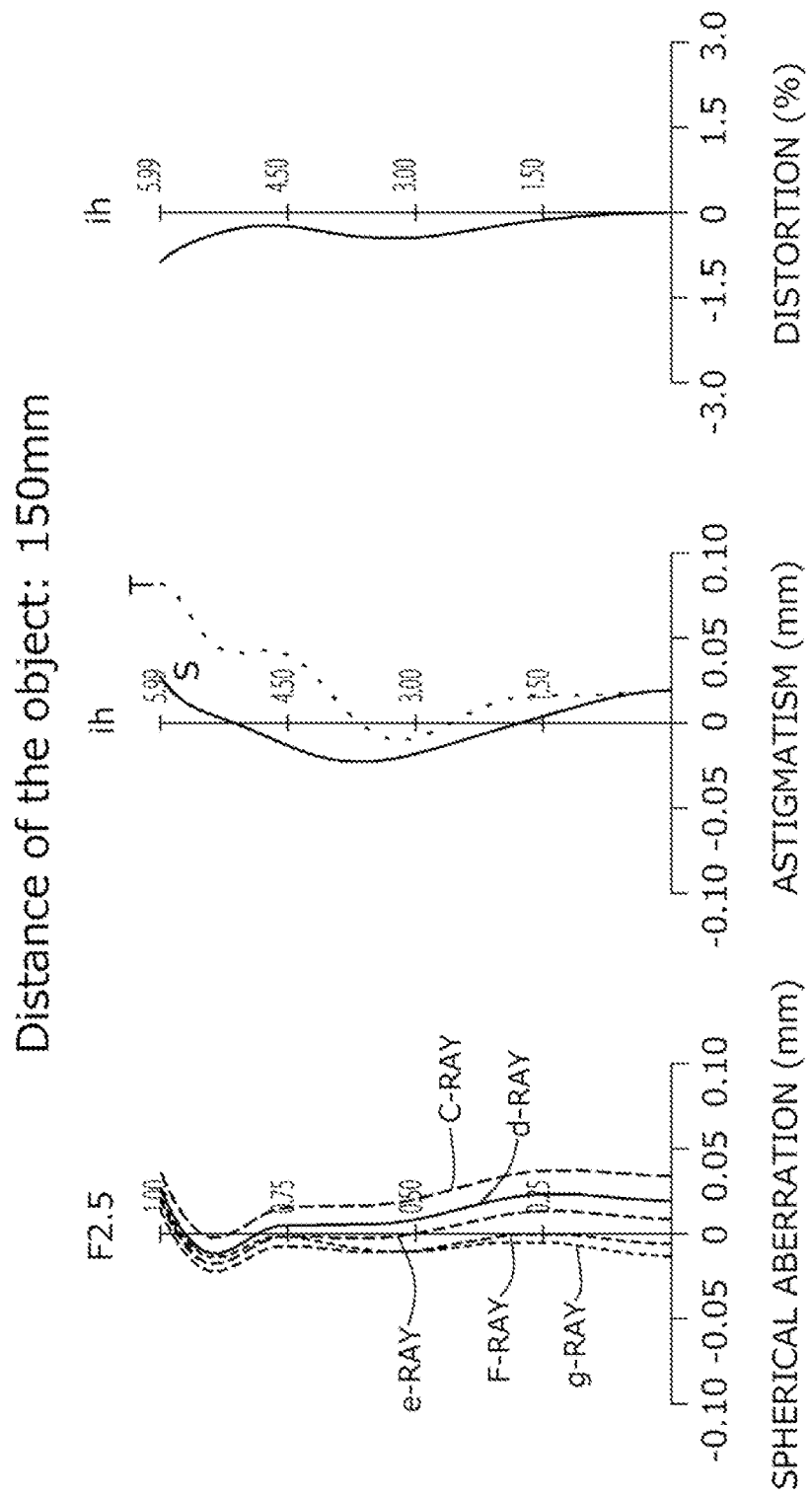
FIG. 30 shows spherical aberration, astigmatism, and distortion of the imaging lens according to Example 10 in which the distance of the object is 150 mm.

FIG. 29 shows various aberrations of the imaging lens according to Example 10 in which the object is at infinity, and FIG. 30 shows various aberrations of the imaging lens according to Example 10 in which the entire imaging lens is extended for autofocusing and the distance of the object is 150 mm. As shown in FIGS. 29 and 30, various aberrations are corrected properly.

The imaging lens provides a wide field of view of nearly 80 degrees and high brightness with an F-value of 2.5. The ratio of total track length TTL to maximum image height ih (TTL/2ih) is 0.79, so it offers a compact design though it uses seven constituent lenses.

As explained above, the imaging lenses according to the preferred embodiment of the present invention realize an imaging lens system which provides a wide field of view of nearly 80 degrees and relatively high brightness with an F-value of 2.4 to 2.6 and which, when the entire imaging lens is extended for autofocusing, corrects aberrations properly in both imaging of an object at infinity and imaging of an object at close range. In addition, the ratio of total track length TTL to maximum image height ih (TTL/2ih) is 0.8 or so, offering a compact lens system.

Table 11 shows data on Examples 1 to 10 in relation to the conditional expressions (1) to (8).

TABLE 11

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Conditional Expression (1) $0 < f12$ | 7.09 | 6.97 | 7.00 | 6.57 | 6.85 | 6.74 | 6.01 | 6.77 | 6.49 | 7.17 |
| Conditional Expression (2) $0.6 < f12/f < 1.3$ | 0.94 | 0.93 | 0.93 | 0.86 | 0.92 | 0.90 | 0.80 | 0.92 | 0.87 | 0.97 |
| Conditional Expression (3) $-2.2 < f3/f < -1.0$ | −1.41 | −1.42 | −1.38 | −1.31 | −1.29 | −1.36 | −1.86 | −1.44 | −1.38 | −1.42 |
| Conditional Expression (4) $0.6 < f45/f < 2.2$ | 1.06 | 1.07 | 1.08 | 0.83 | 1.02 | 1.05 | 1.81 | 1.10 | 1.44 | 1.04 |
| Condidonal Expression (5) $-2.0 < f67/f < -0.6$ | −1.27 | −1.13 | −1.40 | −0.78 | −1.13 | −1.16 | −1.31 | −1.20 | −1.62 | −1.21 |
| Conditional Expression (6) $50 < vd1 < 70$ | 55.57 | 55.57 | 55.57 | 55.57 | 55.57 | 55.57 | 55.57 | 55.57 | 55.57 | 55.57 |
| Conditional Expression (7) $50 < vd2 < 70$ | 55.57 | 55.57 | 55.57 | 55.57 | 55.57 | 55.57 | 55.57 | 55.57 | 55.57 | 55.57 |
| Conditional Expression (8) $20 < vd3 < 30$ | 23.97 | 23.97 | 23.97 | 23.97 | 23.97 | 23.97 | 23.97 | 23.97 | 23.97 | 23.97 |

The imaging lens composed of seven constituent lenses according to the present invention features compactness and a wide field of view and meets the demand for high resolution images. In particular, when it is used in a highly functional product such as a smart TV or 4K TV, or an information terminal such as a game console or PC, or a mobile terminal such as a smart phone or mobile phone with a professional quality digital camera function or PDA (Personal Digital Assistant), it enhances the performance of the product in which it is mounted.

The effects of the present invention are as follows.

According to the present invention, it is possible to provide a compact imaging lens which delivers higher optical performance than existing imaging lenses when it is used not only in a conventional small image sensor but also in a large image sensor and can correct various aberrations properly in both imaging of an object at infinity and imaging of an object at close range even though it provides a wide field of view.

What is claimed is:

1. An imaging lens for a solid-state image sensor, comprising in order from an object side to an image side of the imaging lens:
    a first lens having positive refractive power;
    a second lens having positive or negative refractive power;
    a third lens;
    a fourth lens that is a double-sided aspheric lens having positive or negative refractive power;
    a fifth lens that is a double-sided aspheric lens having positive refractive power;
    a sixth lens that is a double-sided aspheric lens having positive or negative refractive power;
    a seventh lens that is a double-sided aspheric lens having a concave surface facing the object side near an optical axis; and
    air gaps disposed between each pair of adjacent lenses,
    wherein the imaging lens has a total of seven single lenses, and when f12 is a composite focal length of the first lens and the second lens, a conditional expression (1') below is satisfied:

$$6.01 \leq f12. \tag{1'}$$

2. The imaging lens according to claim 1, wherein the first lens has a convex surface facing the object side, the second lens has a convex surface facing the image side, and at least one of facing surfaces of the first lens and the second lens has a concave surface.

3. The imaging lens according to claim 1, wherein the third lens is a double-sided aspheric lens and has negative refractive power and a concave surface facing the image side near the optical axis.

4. The imaging lens according to claim 1, wherein the fourth lens is one of:
    a biconvex lens having a convex surface facing the object side near the optical axis, and
    a meniscus lens having a convex surface facing the object side.

5. The imaging lens according to claim 1, wherein an image-side surface of the sixth lens has an aspheric shape in which a portion near the optical axis has a concave shape and the concave shape changes to a convex shape in a peripheral portion separated from the optical axis.

6. The imaging lens according to claim 1, wherein when f is an overall focal length of the imaging lens, a conditional expression (2) below is satisfied:

$$0.6<f12/f<1.3. \qquad (2)$$

7. The imaging lens according to claim 1, wherein when f3 is a focal length of the third lens, and f is an overall focal length of the imaging lens, a conditional expression (3) below is satisfied:

$$-2.2<f3/f<-1.0. \qquad (3)$$

8. The imaging lens according to claim 1, wherein when f45 is a composite focal length of the fourth lens and the fifth lens, and f is an overall focal length of the imaging lens, a conditional expression (4) below is satisfied:

$$0.6<f45/f<2.2. \qquad (4)$$

9. The imaging lens according to claim 1, wherein when f67 is a composite focal length of the sixth lens and the seventh lens, and f is an overall focal length of the imaging lens, a conditional expression (5) below is satisfied:

$$-2.0<f67/f<-0.6. \qquad (5)$$

10. The imaging lens according to claim 1, wherein when vd1 is an Abbe number of the first lens at d-ray, vd2 is an Abbe number of the second lens at d-ray, and vd3 is an Abbe number of the third lens at d-ray, conditional expressions (6) to (8) below are satisfied:

$$50<vd1<70 \qquad (6)$$

$$50<vd2<70 \qquad (7)$$

$$20<vd3<30. \qquad (8)$$

11. An imaging lens for a solid-state image sensor, comprising in order from an object side to an image side of the imaging lens:
   a first lens having positive refractive power;
   a second lens having positive or negative refractive power;
   a third lens;
   a fourth lens that is a double-sided aspheric lens having positive refractive power and a convex surface facing the object side near an optical axis;
   a fifth lens that is a double-sided aspheric lens;
   a sixth lens that is a double-sided aspheric lens having positive or negative refractive power and a concave surface facing the image side near the optical axis;
   a seventh lens that is a double-sided aspheric lens having a meniscus shape near the optical axis; and
   air gaps disposed between each pair of adjacent lenses.

12. The imaging lens according to claim 11, wherein the first lens has a convex surface facing the object side, second lens has a convex surface facing the image side, and at least one of facing surfaces of the first lens and the second lens has a concave surface.

13. The imaging lens according to claim 11, wherein the third lens is a double-sided aspheric lens having negative refractive power and a concave surface facing the image side near the optical axis.

14. The imaging lens according to claim 11, wherein the fourth lens is one of:
   a biconvex lens having a convex surface facing the object side near the optical axis, and
   a meniscus lens having a convex surface facing the object side.

15. The imaging lens according to claim 11, wherein an image-side surface of the sixth lens has an aspheric shape in which a portion near the optical axis has a concave shape and the concave shape changes to a convex shape in a peripheral portion separated from the optical axis.

16. The imaging lens according to claim 11, wherein when f12 is a composite focal length of the first lens and the second lens, and f is an overall focal length of the imaging lens, a conditional expression (2) below is satisfied:

$$0.6<f12/f<1.3. \qquad (2)$$

17. The imaging lens according to claim 11, wherein when f3 is a focal length of the third lens, and f is an overall focal length of the imaging lens, a conditional expression (3) below is satisfied:

$$-2.2<f3/f<-1.0. \qquad (3)$$

18. The imaging lens according to claim 11, wherein when f45 is a composite focal length of the fourth lens and the fifth lens, and f is an overall focal length of the imaging lens, a conditional expression (4) below is satisfied:

$$0.6<f45/f<2.2. \qquad (4)$$

19. The imaging lens according to claim 11, wherein when f67 is a composite focal length of the sixth lens and the seventh lens, and f is an overall focal length of the imaging lens, a conditional expression (5) below is satisfied:

$$-2.0<f67/f<-0.6. \qquad (5)$$

20. The imaging lens according to claim 11, wherein when vd1 is an Abbe number of the first lens at d-ray, vd2 is an Abbe number of the second lens at d-ray, and vd3 is an Abbe number of the third lens at d-ray, conditional expressions (6) to (8) below are satisfied:

$$50<vd1<70 \qquad (6)$$

$$50<vd2<70 \qquad (7)$$

$$20<vd3<30. \qquad (8)$$

* * * * *